(12) United States Patent
Edlund

(10) Patent No.: US 11,141,692 B2
(45) Date of Patent: *Oct. 12, 2021

(54) HYDROGEN GENERATION ASSEMBLIES AND HYDROGEN PURIFICATION DEVICES

(71) Applicant: Element 1 Corp., Bend, OR (US)

(72) Inventor: David J. Edlund, Bend, OR (US)

(73) Assignee: Element 1 Corp, Bend, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/887,360

(22) Filed: May 29, 2020

(65) Prior Publication Data
US 2020/0289977 A1      Sep. 17, 2020

Related U.S. Application Data

(60) Continuation of application No. 16/226,225, filed on Dec. 19, 2018, now Pat. No. 10,702,827, which is a
(Continued)

(51) Int. Cl.
*B01D 53/22* (2006.01)
*C01B 3/32* (2006.01)
(Continued)

(52) U.S. Cl.
CPC .......... *B01D 53/22* (2013.01); *B01D 63/087* (2013.01); *C01B 3/22* (2013.01); *C01B 3/24* (2013.01);
(Continued)

(58) Field of Classification Search
CPC .......... C01B 33/32; C01B 2203/0405; B01D 53/22; B01D 63/08
See application file for complete search history.

(56) References Cited

U.S. PATENT DOCUMENTS 2,196,343 A     4/1940    Saltsman
3,154,920 A    11/1964    Nash et al.
(Continued)

FOREIGN PATENT DOCUMENTS

CA    2467012          4/2001
CN    1384043 A       12/2002
(Continued)

OTHER PUBLICATIONS

US Receiving Office, Written Opinion for PCT Application No. PCT/US2014/019837, dated Jun. 6, 2014, 8 pages.
(Continued)

*Primary Examiner* — Matthew J Merkling
(74) *Attorney, Agent, or Firm* — Chernoff Vilhauer LLP

(57) ABSTRACT

Hydrogen generation assemblies, hydrogen purification devices, and their components are disclosed. In some embodiments, the devices may include a permeate frame with a membrane support structure having first and second membrane support plates that are free from perforations and that include a plurality of microgrooves configured to provide flow channels for at least part of the permeate stream. In some embodiments, the assemblies may include a return conduit fluidly connecting a buffer tank and a reformate conduit, a return valve assembly configured to manage flow in the return conduit, and a control assembly configured to operate a fuel processing assembly between run and standby modes based, at least in part, on detected pressure in the buffer tank and configured to direct the return valve assembly to allow product hydrogen stream to flow from the buffer tank to the reformate conduit when the fuel processing assembly is in the standby mode.

11 Claims, 8 Drawing Sheets

Related U.S. Application Data continuation of application No. 15/483,265, filed on Apr. 10, 2017, now Pat. No. 10,166,506, which is a continuation of application No. 14/931,585, filed on Nov. 3, 2015, now Pat. No. 9,616,389, which is a division of application No. 13/829,766, filed on Mar. 14, 2013, now Pat. No. 9,187,324, which is a continuation-in-part of application No. 13/600,096, filed on Aug. 30, 2012, now abandoned.

(51) Int. Cl.

| | | |
|---|---|---|
| *C01B 3/50* | (2006.01) | |
| *B01D 63/08* | (2006.01) | |
| *C01B 3/22* | (2006.01) | |
| *C01B 3/24* | (2006.01) | |
| *C01B 3/34* | (2006.01) | |

(52) U.S. Cl.

CPC ............... *C01B 3/32* (2013.01); *C01B 3/323* (2013.01); *C01B 3/34* (2013.01); *C01B 3/503* (2013.01); *B01D 2053/222* (2013.01); *B01D 2313/14* (2013.01); *B01D 2313/23* (2013.01); *B01D 2313/26* (2013.01); *C01B 2203/0205* (2013.01); *C01B 2203/0244* (2013.01); *C01B 2203/0283* (2013.01); *C01B 2203/043* (2013.01); *C01B 2203/044* (2013.01); *C01B 2203/0405* (2013.01); *C01B 2203/047* (2013.01); *C01B 2203/0445* (2013.01); *C01B 2203/0811* (2013.01); *C01B 2203/1217* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01); *C01B 2203/146* (2013.01); *C01B 2203/16* (2013.01); *C01B 2203/169* (2013.01); *C01B 2203/1619* (2013.01)

(56) References Cited

U.S. PATENT DOCUMENTS

| | | | |
|---|---|---|---|
| 3,608,610 A | 9/1971 | Greatorex et al. | |
| 3,761,386 A | 9/1973 | Smith | |
| 3,935,636 A | 2/1976 | Mermelstein | |
| 3,984,324 A | 10/1976 | Wang | |
| 4,124,478 A | 11/1978 | Tsien et al. | |
| 4,319,978 A | 3/1982 | Millman | |
| 4,692,306 A | 9/1987 | Minet | |
| 5,053,195 A | 10/1991 | MacKay | |
| 5,139,541 A | 8/1992 | Edlund | |
| 5,164,163 A | 11/1992 | Aoki et al. | |
| 5,182,075 A | 1/1993 | Gotoh et al. | |
| 5,217,506 A | 6/1993 | Edlund et al. | |
| 5,259,870 A | 11/1993 | Edlund | |
| 5,266,283 A | 11/1993 | Friesen et al. | |
| 5,393,325 A | 2/1995 | Edlund | |
| 5,498,278 A | 3/1996 | Edlund | |
| 5,536,405 A | 7/1996 | Myma et al. | |
| 5,645,626 A | 7/1997 | Edlund et al. | |
| 5,711,882 A | 1/1998 | Hofmann et al. | |
| 5,782,960 A | 7/1998 | Ogawa et al. | |
| 5,791,308 A | 8/1998 | Carter et al. | |
| 5,861,137 A | 1/1999 | Edlund | |
| 5,888,273 A | 3/1999 | Buxbaum | |
| 5,904,754 A | 5/1999 | Juda et al. | |
| 5,964,089 A | 10/1999 | Murphy et al. | |
| 5,997,594 A | 12/1999 | Edlund et al. | |
| 6,136,222 A | 10/2000 | Friesen et al. | |
| 6,152,995 A | 11/2000 | Edlund | |
| 6,168,650 B1 | 1/2001 | Buxbaum | |
| 6,171,574 B1 | 1/2001 | Juda et al. | |
| 6,183,542 B1 | 2/2001 | Bossard | |
| 6,183,543 B1 | 2/2001 | Buxbaum | |
| 6,189,568 B1 | 2/2001 | Bergum et al. | |
| 6,221,117 B1 | 4/2001 | Edlund et al. | |
| 6,241,945 B1 | 6/2001 | Owen | |
| 6,319,306 B1 | 11/2001 | Edlund et al. | |
| 6,332,913 B1 | 12/2001 | Breitschwerdt et al. | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,465,118 B1 | 10/2002 | Dickman et al. | |
| 6,475,268 B2 | 11/2002 | Thornton | |
| 6,494,937 B1 | 12/2002 | Edlund et al. | |
| 6,495,277 B1 | 12/2002 | Edlund et al. | |
| 6,511,521 B1 * | 1/2003 | Parchamazad | B01D 53/22 48/128 |
| 6,537,352 B2 * | 3/2003 | Edlund | B01J 19/2475 96/4 |
| 6,547,858 B1 | 4/2003 | Edlund et al. | |
| 6,562,111 B2 | 5/2003 | Edlund et al. | |
| 6,569,227 B2 * | 5/2003 | Edlund | C01B 3/503 96/4 |
| 6,596,057 B2 | 7/2003 | Edlund et al. | |
| 6,632,270 B2 | 10/2003 | Edlund et al. | |
| 6,660,069 B2 | 12/2003 | Sato et al. | |
| 6,667,128 B2 | 12/2003 | Edlund | |
| 6,719,831 B2 | 4/2004 | Edlund et al. | |
| 6,719,832 B2 | 4/2004 | Edlund et al. | |
| 6,723,156 B2 | 4/2004 | Edlund et al. | |
| 6,767,389 B2 | 7/2004 | Edlund et al. | |
| 6,783,741 B2 | 8/2004 | Edlund et al. | |
| 6,811,908 B2 | 11/2004 | Edlund et al. | |
| 6,818,335 B2 | 11/2004 | Edlund et al. | |
| 6,824,593 B2 | 11/2004 | Edlund et al. | |
| 6,835,481 B2 | 12/2004 | Dickman et al. | |
| 6,858,341 B2 | 2/2005 | Edlund | |
| 6,869,707 B2 | 3/2005 | Edlund et al. | |
| 6,872,464 B2 | 3/2005 | Hubner et al. | |
| 6,878,474 B2 | 4/2005 | Dickman et al. | |
| 6,890,672 B2 | 5/2005 | Dickman et al. | |
| 6,896,709 B1 | 5/2005 | Han et al. | |
| 6,953,497 B2 | 10/2005 | Edlund et al. | |
| 6,979,507 B2 | 12/2005 | Edlund et al. | |
| 6,994,927 B2 | 2/2006 | Edlund et al. | |
| 7,005,113 B2 | 2/2006 | Edlund et al. | |
| 7,008,708 B2 | 3/2006 | Edlund et al. | |
| 7,022,395 B2 | 4/2006 | Ackerman et al. | |
| 7,029,515 B2 | 4/2006 | Krueger | |
| 7,033,641 B2 | 4/2006 | Saijo et al. | |
| 7,052,530 B2 | 5/2006 | Edlund et al. | |
| 7,063,047 B2 | 6/2006 | Reinke et al. | |
| 7,101,421 B2 | 9/2006 | Edlund et al. | |
| 7,135,048 B1 | 11/2006 | Edlund et al. | |
| 7,147,677 B2 | 12/2006 | Edlund | |
| 7,182,917 B2 | 2/2007 | Krueger | |
| 7,195,663 B2 | 3/2007 | Edlund et al. | |
| 7,201,783 B2 | 4/2007 | Edlund | |
| 7,208,241 B2 | 4/2007 | Edlund et al. | |
| 7,250,231 B2 | 7/2007 | Edlund | |
| 7,258,946 B2 | 8/2007 | Edlund | |
| 7,297,183 B2 | 11/2007 | Edlund et al. | |
| 7,306,868 B2 | 12/2007 | Arthur | |
| 7,341,609 B2 | 3/2008 | DeVries | |
| 7,368,194 B2 | 5/2008 | Dickman et al. | |
| 7,368,195 B2 | 5/2008 | Edlund et al. | |
| 7,390,587 B2 | 6/2008 | Dickman et al. | |
| 7,410,531 B2 | 8/2008 | Edlund et al. | |
| 7,470,293 B2 | 12/2008 | Edlund et al. | |
| 7,476,455 B2 | 1/2009 | Edlund | |
| 7,485,381 B2 | 2/2009 | Dickman et al. | |
| 7,601,302 B2 | 10/2009 | Edlund et al. | |
| 7,632,321 B2 | 12/2009 | Edlund | |
| 7,632,322 B2 | 12/2009 | Edlund | |
| 7,659,019 B2 | 2/2010 | Edlund | |
| 7,682,718 B2 | 3/2010 | Dickman et al. | |
| 7,736,596 B2 | 6/2010 | Edlund et al. | |
| 7,771,882 B2 | 8/2010 | Edlund et al. | |

(56) References Cited

U.S. PATENT DOCUMENTS

| | | |
|---|---|---|
| 7,789,941 B2 | 9/2010 | Edlund et al. |
| 7,819,955 B2 | 10/2010 | Edlund et al. |
| 7,828,864 B2 | 11/2010 | Edlund et al. |
| 7,846,569 B2 | 12/2010 | Edlund et al. |
| 7,939,211 B2 | 5/2011 | Edlund et al. |
| 7,977,000 B2 | 7/2011 | Edlund |
| 7,981,172 B2 | 7/2011 | Edlund et al. |
| 7,985,510 B2 | 7/2011 | Edlund et al. |
| 8,021,446 B2 | 9/2011 | Adams et al. |
| 8,038,748 B2 | 10/2011 | Edlund |
| 8,057,575 B2 | 11/2011 | Edlund et al. |
| 8,133,626 B2 | 3/2012 | Edlund et al. |
| 8,262,752 B2 | 9/2012 | Popham |
| 8,603,219 B2 | 12/2013 | Edlund |
| 8,961,627 B2 | 2/2015 | Edlund |
| 9,187,324 B2 | 11/2015 | Edlund |
| 9,616,389 B2 | 4/2017 | Edlund |
| 9,656,215 B2 | 5/2017 | Edlund |
| 9,914,641 B2 | 5/2018 | Edlund et al. |
| 10,166,506 B2 | 1/2019 | Edlund |
| 10,391,458 B2 | 8/2019 | Edlund |
| 10,702,827 B2 | 7/2020 | Edlund |
| 2001/0045061 A1 | 11/2001 | Edlund et al. |
| 2002/0071976 A1 | 6/2002 | Edlund |
| 2002/0081235 A1 | 6/2002 | Baldwin et al. |
| 2002/0100518 A1 | 8/2002 | Kuriiwa et al. |
| 2002/0114984 A1 | 8/2002 | Edlund et al. |
| 2003/0015096 A1 | 1/2003 | Sato et al. |
| 2003/0033933 A1 | 2/2003 | Frost et al. |
| 2003/0087138 A1 | 5/2003 | Margiott et al. |
| 2003/0091876 A1 | 5/2003 | Rusta-Sellehy et al. |
| 2003/0167690 A1 | 9/2003 | Edlund et al. |
| 2003/0192251 A1 | 10/2003 | Edlund et al. |
| 2003/0223926 A1 | 12/2003 | Edlund et al. |
| 2004/0065013 A1 | 4/2004 | DeVries |
| 2004/0066043 A1 | 4/2004 | Maiwald et al. |
| 2004/0067195 A1 | 4/2004 | Strizki et al. |
| 2004/0081867 A1 | 4/2004 | Edlund |
| 2004/0081868 A1 | 4/2004 | Edlund |
| 2004/0197616 A1 | 10/2004 | Edlund et al. |
| 2004/0200459 A1 | 10/2004 | Bennett et al. |
| 2004/0229090 A1 | 11/2004 | Davis et al. |
| 2005/0000802 A1 | 1/2005 | Hobbs |
| 2005/0129995 A1 | 6/2005 | Kato |
| 2005/0132640 A1 | 6/2005 | Kelly |
| 2005/0154198 A1 | 7/2005 | Trotta et al. |
| 2005/0172554 A1 | 8/2005 | Basho et al. |
| 2005/0188616 A1 | 9/2005 | Bizjak et al. |
| 2005/0211480 A1 | 9/2005 | Kejha |
| 2005/0265915 A1 | 12/2005 | Tonkovich et al. |
| 2006/0019134 A1 | 1/2006 | Yagi et al. |
| 2006/0037476 A1* | 2/2006 | Edlund ............... B01D 63/06 96/4 |
| 2006/0051638 A1 | 3/2006 | Gross |
| 2006/0083956 A1 | 4/2006 | Ukai et al. |
| 2006/0090397 A1 | 5/2006 | Edlund et al. |
| 2006/0112636 A1 | 6/2006 | Chellappa et al. |
| 2006/0127719 A1 | 6/2006 | Brantley et al. |
| 2006/0144700 A1 | 7/2006 | Carson et al. |
| 2006/0216562 A1 | 9/2006 | Edlund et al. |
| 2006/0225350 A1 | 10/2006 | Spallone et al. |
| 2006/0233700 A1 | 10/2006 | Chellappa et al. |
| 2007/0062116 A1 | 3/2007 | Edlund et al. |
| 2007/0183968 A1 | 8/2007 | Healey et al. |
| 2007/0190380 A1 | 8/2007 | DeVries |
| 2007/0266631 A1* | 11/2007 | Pledger ............... H01M 8/0606 48/61 |
| 2007/0274904 A1 | 11/2007 | Popham et al. |
| 2007/0292729 A1 | 12/2007 | Brantley et al. |
| 2008/0029389 A1 | 2/2008 | Dreier et al. |
| 2008/0041454 A1 | 2/2008 | Eijkelenberg et al. |
| 2008/0075987 A1 | 3/2008 | Kindler et al. |
| 2008/0085434 A1 | 4/2008 | Arthur |
| 2008/0115669 A1 | 5/2008 | Edlund et al. |
| 2008/0138677 A1 | 6/2008 | Edlund |
| 2008/0138678 A1 | 6/2008 | Hill |
| 2008/0176118 A1 | 7/2008 | Edlund et al. |
| 2008/0187797 A1 | 8/2008 | Edlund |
| 2008/0210088 A1 | 9/2008 | Pledger |
| 2008/0213638 A1 | 9/2008 | Brantley et al. |
| 2008/0222954 A1 | 9/2008 | Adams et al. |
| 2008/0230039 A1 | 9/2008 | Weiss et al. |
| 2009/0011310 A1 | 1/2009 | Trabold et al. |
| 2010/0055518 A1 | 3/2010 | Chen et al. |
| 2010/0064887 A1 | 3/2010 | Edlund et al. |
| 2010/0167155 A1 | 7/2010 | Kim et al. |
| 2010/0181765 A1 | 7/2010 | More et al. |
| 2010/0230079 A1 | 9/2010 | Byers et al. |
| 2010/0261074 A1 | 10/2010 | Edlund et al. |
| 2010/0263538 A1 | 10/2010 | DeVries |
| 2011/0137537 A1 | 6/2011 | Leone |
| 2011/0180396 A1 | 7/2011 | Giacomini |
| 2011/0250518 A1 | 10/2011 | Edlund et al. |
| 2011/0256459 A1 | 10/2011 | Edlund |
| 2011/0256491 A1 | 10/2011 | Edlund et al. |
| 2012/0058403 A1 | 3/2012 | Edlund et al. |
| 2012/0097610 A1 | 4/2012 | Zheng et al. |
| 2013/0011301 A1 | 1/2013 | Edlund |
| 2013/0090505 A1 | 4/2013 | Catchpole |
| 2014/0065020 A1 | 3/2014 | Edlund et al. |
| 2016/0325990 A1 | 11/2016 | Galloway |
| 2016/0340185 A1 | 11/2016 | Xiang |
| 2017/0043300 A1 | 2/2017 | Stoltenberg |
| 2017/0216805 A1 | 3/2017 | Edlund |
| 2017/0209828 A1 | 7/2017 | Edlund |
| 2018/0126330 A1 | 5/2018 | Edlund |
| 2018/0264398 A1 | 9/2018 | Edlund |
| 2019/0118132 A1 | 4/2019 | Edlund |
| 2019/0336920 A1 | 11/2019 | Edlund |
| 2020/0289978 A1 | 9/2020 | Edlund |
| 2020/0316517 A1 | 10/2020 | Edlund |

FOREIGN PATENT DOCUMENTS

| | | |
|---|---|---|
| CN | 1524308 | 8/2004 |
| CN | 1931708 | 3/2007 |
| CN | 201161926 Y | 12/2008 |
| CN | 101350411 | 1/2009 |
| CN | 101542805 A | 9/2009 |
| CN | 101956634 A | 1/2011 |
| CN | 107265403 B | 3/2020 |
| CN | 111542383 A | 8/2020 |
| DE | 69120740 | 11/1996 |
| DE | 69219084 | 7/1997 |
| DE | 69730071 | 8/2005 |
| DE | 60035418 | 3/2008 |
| DE | 202007008841 U1 | 6/2008 |
| EP | 0570185 | 11/1993 |
| EP | 0652042 | 5/1995 |
| EP | 0718031 | 6/1996 |
| EP | 0470822 | 7/1996 |
| EP | 0546808 | 4/1997 |
| EP | 0783919 | 7/1997 |
| EP | 0957063 | 11/1999 |
| EP | 1010942 | 2/2003 |
| EP | 0800852 | 8/2004 |
| EP | 1272259 | 10/2004 |
| EP | 1516663 | 3/2005 |
| EP | 1135822 | 4/2005 |
| EP | 1279431 | 4/2005 |
| EP | 1523054 | 4/2005 |
| EP | 1557395 | 7/2005 |
| EP | 1679111 | 7/2006 |
| EP | 0951529 | 8/2006 |
| EP | 1252678 | 11/2006 |
| EP | 1189678 | 7/2007 |
| EP | 1290747 | 2/2009 |
| EP | 1138096 | 10/2010 |
| EP | 2359928 | 8/2011 |
| GB | 2355418 | 4/2001 |
| GB | 2370241 | 6/2002 |
| JP | 63021204 | 1/1988 |
| JP | 63039622 | 2/1988 |
| JP | 63126539 | 5/1988 |

(56) References Cited

FOREIGN PATENT DOCUMENTS

| | | |
|---|---|---|
| JP | 63252903 | 10/1988 |
| JP | 64063019 | 3/1989 |
| JP | H06127903 | 5/1994 |
| JP | 10052621 | 2/1998 |
| JP | 11265833 | 9/1999 |
| JP | 2001010804 | 1/2001 |
| JP | 202293504 A | 10/2002 |
| JP | 2002346372 | 12/2002 |
| JP | 2003081603 A | 3/2003 |
| JP | 2003511336 A | 3/2003 |
| JP | 2003171815 | 7/2003 |
| JP | 2003277019 | 10/2003 |
| JP | 2003282119 | 10/2003 |
| JP | 2003530664 | 10/2003 |
| JP | 2004071242 | 3/2004 |
| JP | 2004525488 A | 8/2004 |
| JP | 2005067990 | 3/2005 |
| JP | 2005154198 | 6/2005 |
| JP | 2006019033 | 1/2006 |
| JP | 2006040597 | 2/2006 |
| JP | 2006503780 | 2/2006 |
| JP | 2006137668 | 6/2006 |
| JP | 2006523795 | 10/2006 |
| JP | 2007095548 | 4/2007 |
| JP | 2007099528 | 4/2007 |
| JP | 2008518871 A | 6/2008 |
| JP | 2008528430 | 7/2008 |
| JP | 2008285404 | 11/2008 |
| JP | 2008305351 | 12/2008 |
| JP | 2009509299 | 3/2009 |
| JP | 2010010050 | 1/2010 |
| JP | 2010013323 | 1/2010 |
| JP | 2011057480 | 3/2011 |
| JP | 2014520750 | 8/2014 |
| JP | 5538764 | 6/2019 |
| JP | 2010111543 A | 5/2020 |
| TW | 563270 | 11/2003 |
| TW | 200404739 | 4/2004 |
| TW | 200629635 | 8/2006 |
| TW | 200740014 | 10/2007 |
| TW | 200804177 | 1/2008 |
| TW | 202045437 | 12/2020 |
| WO | 8806489 | 9/1988 |
| WO | 9919456 | 4/1999 |
| WO | 0022690 | 4/2000 |
| WO | 0056425 | 9/2000 |
| WO | 0108247 | 2/2001 |
| WO | 0112311 | 2/2001 |
| WO | 0112539 | 2/2001 |
| WO | 0126174 | 4/2001 |
| WO | 0150541 | 7/2001 |
| WO | 0150542 | 7/2001 |
| WO | 0168514 | 9/2001 |
| WO | 0170376 | 9/2001 |
| WO | 0173879 | 10/2001 |
| WO | 0193362 | 12/2001 |
| WO | 0238265 | 5/2002 |
| WO | 0249128 | 6/2002 |
| WO | 02069428 | 9/2002 |
| WO | 03002244 | 1/2003 |
| WO | 03026776 | 4/2003 |
| WO | 03041188 | 5/2003 |
| WO | 03077331 | 9/2003 |
| WO | 03086964 | 10/2003 |
| WO | 03089128 | 10/2003 |
| WO | 03100900 | 12/2003 |
| WO | 2004038845 | 5/2004 |
| WO | 2004091005 | 10/2004 |
| WO | 2005001955 | 1/2005 |
| WO | 2005091785 | 10/2005 |
| WO | 2005119824 | 12/2005 |
| WO | 2006033773 | 3/2006 |
| WO | 2006049918 | 5/2006 |
| WO | 2006050335 | 5/2006 |
| WO | 2006081402 | 8/2006 |
| WO | 2006133003 | 12/2006 |
| WO | 2007035467 | 3/2007 |
| WO | 2007037856 | 4/2007 |
| WO | 2007049130 | 5/2007 |
| WO | 2006008279 | 1/2008 |
| WO | 2008033301 | 3/2008 |
| WO | 2008105770 | 9/2008 |
| WO | 2009088962 | 7/2009 |
| WO | 2010033628 | 3/2010 |
| WO | 2010113221 | 10/2010 |
| WO | 2011059446 | 5/2011 |
| WO | 2012067612 | 5/2012 |
| WO | 2012091121 | 7/2012 |

OTHER PUBLICATIONS

Taiwan Intellectual Property Office, Examination Report for Taiwanese Patent Application No. 102131014, dated Dec. 27, 2014, 29 pages.
State Intellectual Property Office of the P.R.C., Office Action for Chinese Patent Application No. 201280039436.0, dated Jan. 27, 2015, 28 pages.
United States Patent and Trademark Office, Office Action for U.S. Appl. No. 13/600,096, dated Feb. 5, 2015, 9 pages.
Japan Patent Office, Office Action for Japanese Patent Application No, 2014-519267, dated Apr. 6, 2015, 13 pages.
Taiwan Intellectual Property Office, Office Action for Taiwanese Patent Application No. 103134184, dated Apr. 30, 2015, 17 pages.
U.S. Patent and Trademark Office, Office Action for U.S. Appl. No. 13/600,096, dated Jun. 1, 2015, 9 pages.
U.S. Patent and Trademark Office, Office Action for U.S. Appl. No. 13/829,766 dated Jun. 26, 2015, 6 pages.
U.S. Patent and Trademark Office, Office Action for U.S. Appl. No. 13/600,096, dated Sep. 11, 2015, 9 pages.
Office Action prepared by the State Intellectual Property Office of PR China for CN 201710352484.X, dated Dec. 11, 2018, 14 pages.
Notice of Reasons for Rejection prepared by the Japanese Patent Office for JP 2017-182239, dated Nov. 12, 2018, 4 pages.
Decision to Reject the Amendments prepared by the Japanese Patent Office for JP 2017-130918, dated Dec. 3, 2018, 6 pages.
Decision of Rejection prepared by the Japanese Patent Office for JP 2017-130918, dated Dec. 3, 2018, 3 pages.
Office Action prepared by the European Patent Office for EP 14 773 171.5-1104, dated Jul. 20, 2018, 5 pages.
Office Action prepared by the European Patent Office for EP 13 832 056.9-1101, dated Aug. 21, 2018, 4 pages.
Office Action prepared by the Japanese Patent Office for JP 2017-130918, dated Jul. 30, 2018, 7 pages.
International Search Report and Written Opinion prepared by the US Patent and Trademark Office for PCT/US2019/012192, dated Mar. 8, 2019, 11 pages.
Office Action prepared by the European Patent Office for EP 13 832 056.9, dated Mar. 20, 2019, 5 pages.
Office Action prepared by the US Patent and Trademark Office for U.S. Appl. No. 15/486,755, dated Mar. 18, 2019, 77 pages.
Office Action prepared by the US Patent and Trademark Office for U.S. Appl. No. 16/287,482, dated Jun. 12, 2019, 10 pages.
Office Action prepared by the European Patent Office for EP 14773171.5, dated Jun. 28, 2019, 4 pages.
Office Action prepared by the Chinese Patent Office for CN 201710352484X, dated Jul. 18, 2019, 3 pages.
Hearing Notice for In 433/KOLNP/2015, Jul. 30, 2019, 2 pages.
Office Action prepared by the China National Intellectual Property Administration for CN 201710102421, dated Sep. 16, 2019, 12 pages.
Election/Restriction Requirement prepared by the US Patent and Trademark Office for U.S. Appl. No. 15/862,474, dated Sep. 30, 2019, 6 pages.
Office Action prepared by the US Patent and Trademark Office for U.S. Appl. No. 15/985,175, dated Oct. 10, 2019, 57 pages.
Office Action prepared by the Taiwan Patent Office for TW 107145920, dated Nov. 5, 2019, 21 pages.

(56) References Cited

OTHER PUBLICATIONS

Office Action prepared by the US Patent and Trademark Office for U.S. Appl. No. 15/985,175, dated Jan. 29, 2020, 8 pages.
Office Action prepared by the Chinese Patent Office for CN201710102421, dated Apr. 16, 2020, 29 pages.
Examiner's Report prepared by the Canadian Patent Office for CA 2,967,340, dated May 22, 2020, 4 pages.
Office Action prepared by the Mexican Patent Office for MX/a/ 2015/012252, dated Jul. 23, 2020, 4 pages.
Office Action prepared by the European Patent Office for EP13832056, dated Sep. 3, 2020, 4 pages.
Office Action prepared by the US Patent and Trademark Office for U.S. Appl. No. 16/904,872, dated Sep. 22, 2020, 8 pages.
Office Action prepared by the Chinese Patent Office for CN201710102421, dated Oct. 20, 2020, 15 pages.
First Examination Report prepared by the Indian Patent Office for IN 202037032378, dated Oct. 21, 2020, 7 pages.
Office Action prepared by the US Patent and Trademark Office for U.S. Appl. No. 16/891,477, dated Nov. 6, 2020 6 pages.
Final Office Action prepared by the US Patent and Trademark Office for U.S. Appl. No. 16/904,872, dated Jan. 27, 2021, 11 pages.
First Office Action prepared by the Japanese Patent Office for JP 2020-79526, dated Mar. 15, 2021, 6 pages.
Taiwan Intellectual Property Office, Decision of Rejection for Taiwanese Patent Application No. 102131014, dated Nov. 2, 2015, 20 pages.
Taiwan Intellectual Property Office, Examination Report for Taiwanese Patent Application No. 103108640, dated Nov. 23, 2015, 39 pages.
State Intellectual Property Office of the P.R.C., Office Action for Chinese Patent Application No. 201380052485.2, dated Jan. 12, 2016, 29 pages.
Japan Patent Office, Office Action for Japanese Patent Application No. 2015-529963, dated Jan. 18, 2016, 7 pages.
European Patent Office, Extended Search Report for European Patent Application No. 13832056.9, dated Mar. 18, 2016, 6 pages.
State Intellectual Property Office of the P.R.C., Office Action for Chinese Patent Application No. 2016062901774250, dated Jul. 4, 2016, 18 pages.
State Intellectual Property Office of the P.R.C., Office Action for Chinese Patent Application No. 201380052485.2, dated Jul. 20, 2016, 31 pages.
Japan Patent Office, Office Action for Japanese Patent Application No. 2015-135010, dated Sep. 12, 2016, 15 pages.
U.S. Patent and Trademark Office, Office Action for U.S. Appl. No. 14/594,997, dated Sep. 15, 2016, 85 pages.
Japan Patent Office, Office Action for Japanese Patent Application No. 2016-500545, dated Oct. 3, 2016, 6 pages.
European Patent Office, Supplementary Search Report for European Patent Application No. 14773171.5, dated Oct. 14, 2016, 7 pages.
State Intellectual Property Office of the P.R.C., Office Action for Chinese Patent Application No. 201380052485.2, dated Dec. 29, 2016, 15 pages.
European Patent Office, Extended Search Report for European Patent Application No. 14773171.5, dated Feb. 13, 2017, 13 pages.
European Patent Office, Communication for European Patent Application No. 14773171.5, dated Mar. 2, 2017, 1 page.
State Intellectual Property Office of the P.R.C., Office Action for Chinese Patent Application No. 201480015413.5, dated Mar. 9, 2017, 17 pages.
State Intellectual Property Office of the P,R.C., Office Action for Chinese Patent Application No. 201510896209.5, dated Mar. 14, 2017, 6 pages.
Taiwan Intellectual Property Office, Decision of Rejection for Taiwanese Patent Application No. 103108640, dated Aug. 25, 2016, 25 pages.
Intellectual Property India, Examination Report for Indian Patent Application No. 433/KOLNP/2015, dated Feb. 28, 2018, 7 pages.
Japan Patent Office, Office Action for Japanese Patent Application No. 2017130918, dated Feb. 26, 2018, 9 pages.
The State Intellectual Property Office of P.R. China, Office Action for Chinese Patent Application No. 2015106962095, dated Jan. 4, 2018, 8 pages.
European Patent Office, Office Action for European Patent Application No. 13832056.9, dated Dec. 19, 2017, 4 pages.
United States Patent and Trademark Office, Office Action for U.S. Appl. No. 15/483,265, dated May 22, 2018, 56 pages.
Edlund, David, "Methanol Fuel Cell Systems: Advancing Towards Commercialization", Pan Stanford Publishing Pte. Ltd., Singapore, 2011, 199 pages.
HGS-M Series Hydrogen Generator: Powering Fuel Cells from readily available Methanol, www.hy9.com, Hopkinton, Massachusetts, USA, updated Jun. 20, 2011, 2 pages.
US Receiving Office, International Search Report for International Application No. PCT/US12/45437, dated Nov. 19, 2012, 6 pages.
US Receiving Office, Written Opinion for International Application No. PCT/US12/45437, dated Nov. 19, 2012, 6 pages.
Taiwan Intellectual Property Office, Examination Report in Taiwanese Patent Application No. 101124209, dated Dec. 19, 2013, 32 pages.
US Receiving Office, International Preliminary Report for PCT Application No. PCT/US2012/045437, dated Jan. 7, 2014, 7 pages.
US Receiving Office, International Search Report for PCT Application No. PCT/US13/56908, dated Jan. 24, 2014, 2 pages.
US Receiving Office, Written Opinion for PCT Application No. PCT/US13/56908, dated Jan. 24, 2014, 12 pages.
US Receiving Office, International Search report for PCT Application No. PCT/US2014/019837, dated Jun. 6, 2014, 2 pages.

\* cited by examiner

HYDROGEN GENERATION ASSEMBLIES AND HYDROGEN PURIFICATION DEVICES

CROSS-REFERENCE TO RELATED APPLICATIONS

This application is a continuation application of U.S. patent application Ser. No. 16/226,225, filed Dec. 19, 2018 and entitled "Hydrogen Generation Assemblies and Hydrogen Purification Device," which is a continuation application of U.S. patent application Ser. No. 15/483,265, filed Apr. 10, 2017 and entitled "Hydrogen Generation Assemblies and Hydrogen Purification Devices," which is a continuation application of U.S. patent application Ser. No. 14/931,585, filed Nov. 3, 2015 and entitled "Hydrogen Generation Assemblies and Hydrogen Purification Devices," which is a divisional application of U.S. patent application Ser. No. 13/829,766, filed Mar. 14, 2013 and entitled "Hydrogen Generation Assemblies and Hydrogen Purification Devices," which is a continuation-in-part application of U.S. patent application Ser. No. 13/600,096, filed Aug. 30, 2012 and entitled "Hydrogen Generation Assemblies." The complete disclosures of the above applications are hereby incorporated by reference for all purposes.

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; U.S. Patent Application Publication Nos. 2006/0090397; 2006/0272212; 2007/0266631; 2007/0274904; 2008/0085434; 2008/0138678; 2008/0230039; 2010/0064887; and 2013/0011301. The complete disclosures of the above patents and patent application publications are hereby incorporated by reference for all purposes.

SUMMARY OF THE DISCLOSURE

Some embodiments may provide a hydrogen purification device. In some embodiments, the hydrogen purification device may include first and second end frames. The first and second end frames may include an input port configured to receive a mixed gas stream containing hydrogen gas and other gases, and an output port configured to receive a permeate stream containing at least one of a greater concentration of hydrogen gas and a lower concentration of the other gases than the mixed gas stream. The first and second end frames may additionally include a byproduct port configured to receive a byproduct stream containing at least a substantial portion of the other gases. The hydrogen purification device may additionally include at least one hydrogen-selective membrane disposed between and secured to the first and second end frames. The at least one hydrogen-selective membrane may have a feed side and a permeate side, at least part of the permeate stream being formed from the portion of the mixed gas stream that passes from the feed side to the permeate side, with the remaining portion of the mixed gas stream, which remains on the feed side, forming at least part of the byproduct stream.

The hydrogen purification device may further include a plurality of frames disposed between the first and second end frames and the at least one hydrogen-selective membrane and secured to the first and second end frame. The plurality of frames may include at least one permeate frame disposed between the at least one hydrogen-selective membrane and the second end frame. The at least one permeate frame may include a perimeter shell and an output conduit formed on the perimeter shell and configured to receive the at least part of the permeate stream from the at least one hydrogen-selective membrane. The at least one permeate frame may additionally include an open region surrounded by the perimeter shell, and at least one membrane support structure that spans at least a substantial portion of the open region and that is configured to support the at least one hydrogen-selective membrane. The at least one membrane support structure may include first and second membrane support plates. Each of the first and second membrane support plates may be free from perforations. Each of the first and second membrane support plates may include a first face having a plurality of microgrooves configured to provide flow channels for the at least part of the permeate stream, and a second face opposed to the first face. The first and second membrane support plates may be stacked in the at least one membrane support structure such that the second face of the first membrane support plate faces the second face of the second membrane support plate.

Some embodiments may provide a hydrogen generation assembly. In some embodiments, the hydrogen generation assembly may include a fuel processing assembly configured to receive a feed stream and to be operable among a plurality of modes. The plurality of modes may include a run mode in which the fuel processing assembly produces a product hydrogen stream from the feed stream, and a standby mode in which the fuel processing assembly does not produce the product hydrogen stream from the feed stream. The fuel processing assembly may include a hydrogen-producing region containing a reforming catalyst and configured to receive the feed stream and produce a reformate stream, and one or more hydrogen-selective membranes configured to receive the reformate stream and produce at least part of the product hydrogen stream and a byproduct stream from the reformate stream. The fuel processing assembly may further include a reformate conduit fluidly connecting the hydrogen-producing region and the one or more hydrogen-selective membranes.

The hydrogen generation assembly may additionally include a buffer tank configured to contain the product hydrogen stream, and a product conduit fluidly connecting the fuel processing assembly and the buffer tank. The hydrogen generation assembly may further include a return conduit fluidly connecting the buffer tank and the reformate conduit, and a tank sensor assembly configured to detect pressure in the buffer tank. The hydrogen generation assembly may additionally include a control assembly configured to operate the fuel processing assembly between the run and standby modes based, at least in part, on the detected pressure in the buffer tank, and a return valve assembly configured to manage flow in the return conduit, the control assembly being configured to direct the return valve assembly to allow the product hydrogen stream to flow from the buffer tank to the reformate conduit when the fuel processing assembly is in the standby mode.

DETAILED DESCRIPTION OF THE DISCLOSURE

Figure 1:
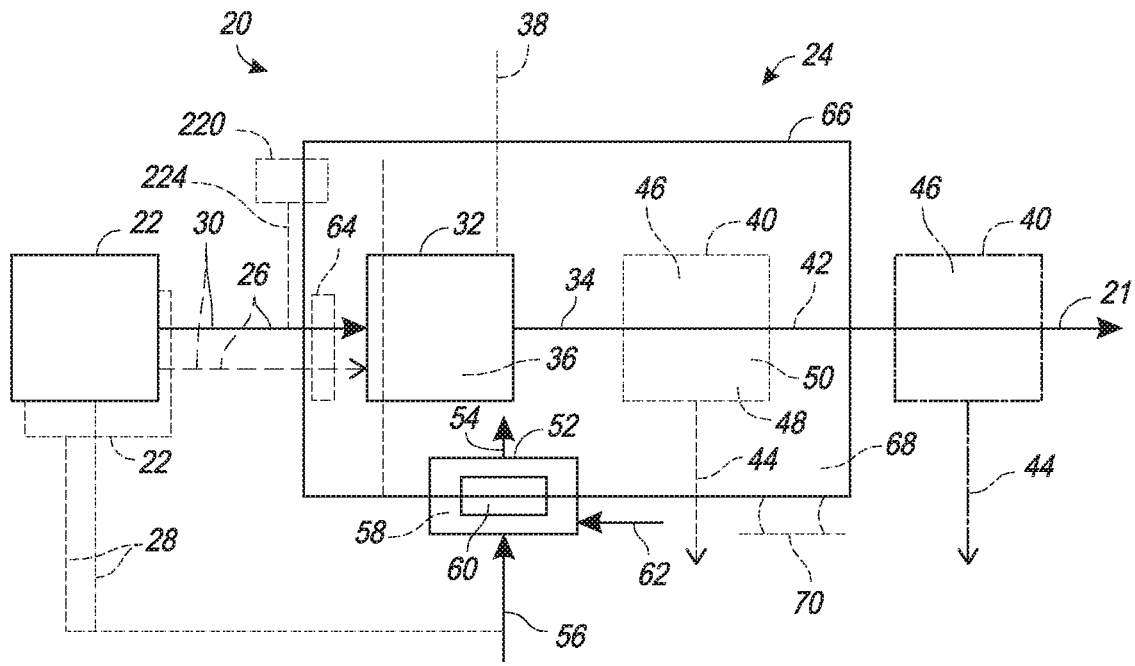
FIG. 1 is a schematic view of an example of a hydrogen generation assembly.

FIG. 1 shows an example of a hydrogen generation assembly 20. Unless specifically excluded hydrogen generation assembly may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 1:1 molar ratio (37 weight % water, 63 weight % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume % methanol or ethanol (or another suitable water-miscible carbon-containing feedstock) and approximately 25-75 volume % water. For feed streams that at least substantially include methanol and water, those streams may include approximately 50-75 volume % methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilizes steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both of the streams may be liquid streams, while in other embodiments both of the streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream 34 may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the deliver of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 volume % hydrogen gas, 15-25 volume % hydrogen gas, 20-30 volume % hydrogen gas, at least 10 or 15 volume % hydrogen gas, at least 20 volume % hydrogen gas, etc.

Purification region 40 may include any suitable structure configured to enrich (and/or increase) the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or difference mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but are at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weight % to 45 weight % copper. A palladium-copper alloy that contains approximately 40 weight % copper has proven particularly effective, although other relative concentrations and components may be used. Two other especially effective alloys are palladium with 2 weight % to 10 weight % gold, especially palladium with 5 weight % gold; and palladium with 3 weight % to 10 weight % indium plus 0 weight % to 10 weight % ruthenium, especially palladium with 6 weight % indium plus 0.5 weight % ruthenium. When palladium and palladium alloys are used, hydrogen-selective membranes 46 may sometimes be referred to as "foils."

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide and oxygen (usually from air) into carbon dioxide, and methanation reactors that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the non-hydrogen impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dash-dot lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid(s) and/or gas(es) that are suitable for being consumed by heating assembly 52 to provide the desired heat output. Some fuel streams may be gases when delivered and combusted by heating assembly 52, while others may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen and carbon monoxide. In embodiments of hydrogen generation assembly 20 that include a temperature modulating assembly in the form of a cooling assembly instead of a heating assembly (such as may be used when an exothermic hydrogen-generating process—e.g., partial oxidation—is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; 5,997,594; and 6,221,117, the complete disclosures of which are hereby incorporated by reference for all purposes.

Figure 2:
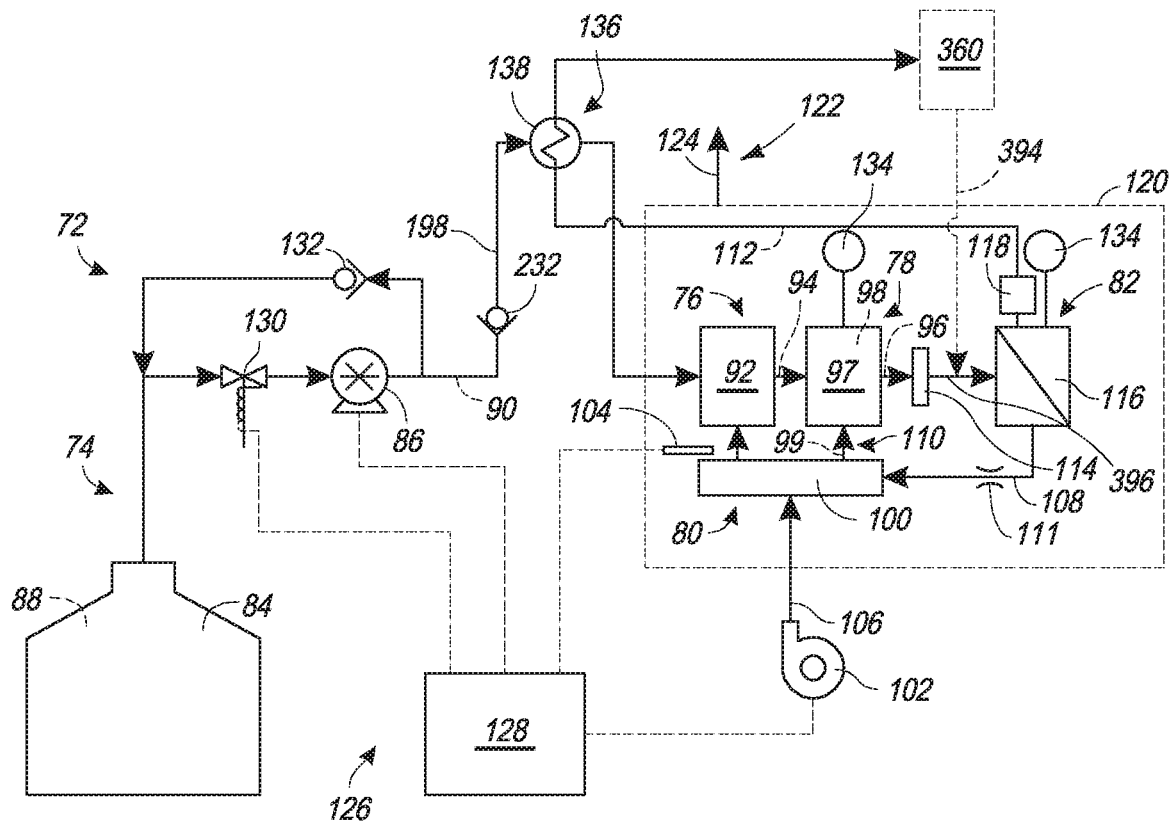
FIG. 2 is a schematic view of another example of a hydrogen generation assembly.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, and a heating assembly 80, as shown in FIG. 2. In some embodiments, hydrogen generation assembly 20 also may include a purification region 82.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams 94. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one of more feed streams, such as vapor feed stream(s) 94 from the vaporization region, to produce one or more output streams 96 containing hydrogen gas as a majority component and other gases. The hydrogen-producing region may produce the output stream via any suitable mechanism(s). For example, hydrogen-producing region 78 may generate output stream(s) 96 via a steam reforming reaction. In that example, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature(s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100, at least one air blower 102, and an igniter assembly 104, as shown in FIG. 2. The burner assembly may include any suitable structure configured to receive at least one air stream 106 and at least one fuel stream 108 and to combust the at least one fuel stream within a combustion region 110 to produce heated exhaust stream 99. The fuel stream may be provided by feedstock delivery system 74 and/or purification region 82. The combustion region may be contained within an enclosure of the hydrogen generation assembly. Air blower 102 may include any suitable structure configured to generate air stream(s) 106. Igniter assembly 104 may include any suitable structure configured to ignite fuel stream(s) 108.

Purification region 82 may include any suitable structure configured to produce at least one hydrogen-rich stream 112, which may include a greater hydrogen concentration than output stream 96 and/or a reduced concentration of one or more other gases (or impurities) that were present in that output stream. The purification region may produce at least one byproduct stream or fuel stream 108, which may be sent to burner assembly 100 and used as a fuel stream for that assembly, as shown in FIG. 2. Purification region 82 may include a flow restricting orifice 111, a filter assembly 114, a membrane assembly 116, and a methanation reactor assembly 118. The filter assembly (such as one or more hot gas filters) may be configured to remove impurities from output stream 96 prior to the hydrogen purification membrane assembly.

Membrane assembly 116 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 116 may incorporate hydrogen-permeable (or hydrogen-selective) membranes that are planar or tubular, and more than one hydrogen-permeable membrane may be incorporated into membrane assembly 116. The permeate stream(s) may be used for any suitable applications, such as for one or more fuel cells. In some embodiments, the membrane assembly may generate a byproduct or fuel stream 108 that includes at least a substantial portion of the other gases. Methanation reactor assembly 118 may include any suitable structure configured to convert carbon monoxide and hydrogen to methane and water. Although purification region 82 is shown to include flow restricting orifice 111, filter assembly 114, membrane assembly 116, and methanation reactor assembly 118, the purification region may have less than all of those assemblies, and/or may alternatively, or additionally, include one or more other components configured to purify output stream 96. For example, purification region 82 may include only membrane assembly 116.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

Hydrogen generation assembly 72 may, in some embodiments, include a control system 126, which may include any suitable structure configured to control operation of hydrogen generation assembly 72. For example, control assembly 126 may include a control assembly 128, at least one valve 130, at least one pressure relief valve 132, and one or more temperature measurement devices 134. Control assembly 128 may detect temperatures in the hydrogen-producing region and/or purification regions via the temperature measurement device 134, which may include one or more thermocouples and/or other suitable devices. Based on the detected temperatures, the control assembly and/or an operator of the control system may adjust delivery of feed stream 90 to vaporization region 76 and/or hydrogen-producing region 78 via valve(s) 130 and pump(s) 86. Valve(s) 130 may include a solenoid valve and/or any suitable valve(s). Pressure relief valve(s) 132 may be configured to ensure that excess pressure in the system is relieved.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from hydrogen-rich stream 112 to feed stream 90 to raise the temperature of the feed stream prior to entering vaporization region 76, as well as to cool hydrogen-rich stream 112.

Figure 3:
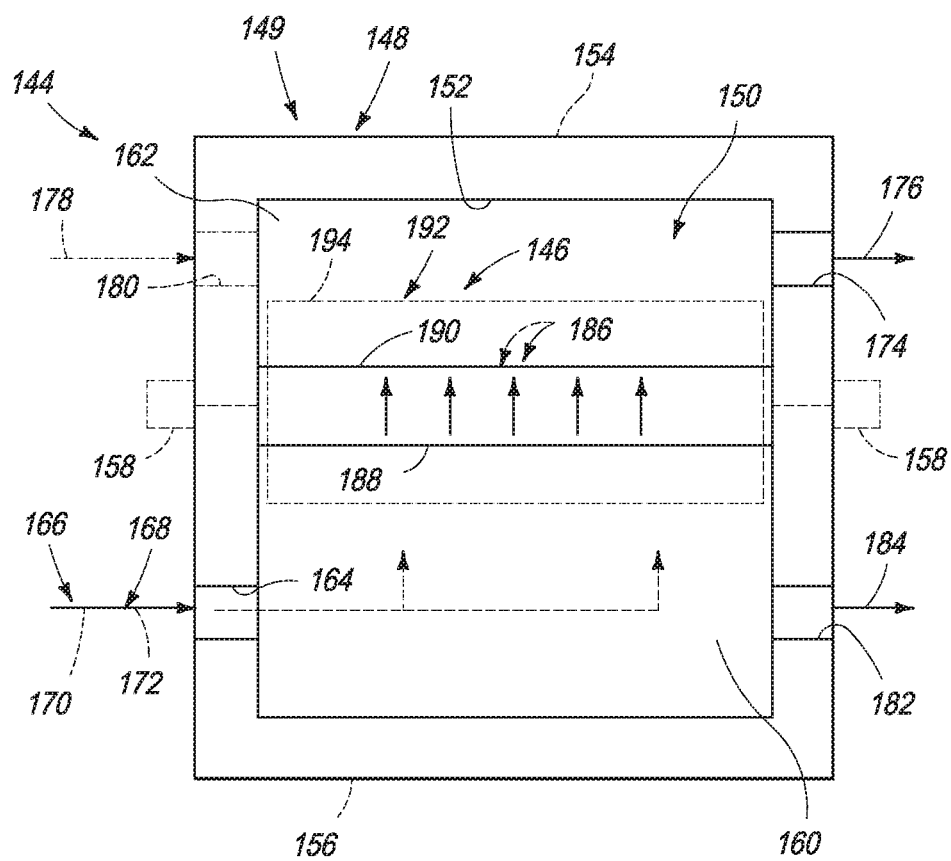
FIG. 3 is a schematic view of a hydrogen purification device of the hydrogen generation assembly of FIG. 1.

An example of a purification region 40 (or hydrogen purification device) of hydrogen generation assembly 20 of FIG. 1 is generally indicated at 144 in FIG. 3. Unless specifically excluded, the hydrogen purification device may include one or more components of the other purification regions described in this disclosure. Hydrogen purification device 40 may include a hydrogen-separation region 146 and an enclosure 148. The enclosure may define an internal volume 150 having an internal perimeter 152. Enclosure 148 may include at least a first portion 154 and a second portion 156 coupled together to form a body 149 in the form of a sealed pressure vessel that may include defined input and output ports. Those ports may define fluid paths by which gases and other fluids are delivered into and removed from the enclosure's internal volume.

First and second portions 154 and 156 may be coupled together using any suitable retention mechanism or structure 158. Examples of suitable retention structures include welds and/or bolts. Examples of seals that may be used to provide a fluid-tight interface between the first and second portions may include gaskets and/or welds. Additionally, or alternatively, first and second portions 154 and 156 may be secured together so that at least a predetermined amount of compression is applied to various components that define the hydrogen-separation region within the enclosure and/or other components that may be incorporated into a hydrogen generation assembly. The applied compression may ensure that various components are maintained in appropriate positions within the enclosure. Additionally, or alternatively, the compression applied to the various components that define the hydrogen-separation region and/or other components may provide fluid-tight interfaces between the various components that define the hydrogen-separation region, various other components, and/or between the components that define the hydrogen-separation region and other components.

Enclosure 148 may include a mixed gas region 160 and a permeate region 162, as shown in FIG. 3. The mixed gas and permeate region may be separated by hydrogen-separation region 146. At least one input port 164 may be provided, through which a fluid stream 166 is delivered to the enclosure. Fluid stream 166 may be a mixed gas stream 168 that contains hydrogen gas 170 and other gases 172 that are delivered to mixed gas region 160. Hydrogen gas may be a majority component of the mixed gas stream. Hydrogen-separation region 146 may extend between mixed gas region 160 and permeate region 162 so that gas in the mixed gas region must pass through the hydrogen-separation region in order to enter the permeate region. The gas may, for example, be required to pass through at least one hydrogen-selective membrane as discussed further below. The permeate and mixed gas regions may be of any suitable relative size within the enclosure.

Enclosure 148 also may include at least one product output port 174 through which a permeate stream 176 may be received and removed from permeate region 162. The permeate stream may contain at least one of a greater concentration of hydrogen gas and a lower concentration of other gases than the mixed gas stream. Permeate stream 176 may, in some embodiments, include at least initially a carrier, or sweep, gas component, such as may be delivered as a sweep gas stream 178 through a sweep gas port 180 that is in fluid communication with the permeate region. The enclosure also may include at least one byproduct output port 182 through which a byproduct stream 184 containing at least one of a substantial portion of other gases 172 and a reduced concentration of hydrogen gas 170 (relative to the mixed gas stream) is removed from the mixed gas region.

Hydrogen-separation region 146 may include at least one hydrogen-selective membrane 186 having a first or mixed gas surface 188, which is oriented for contact by mixed gas stream 168, and a second or permeate surface 190, which is generally opposed to surface 188. Mixed gas stream 168 may be delivered to the mixed gas region of the enclosure so that is comes into contact with the mixed gas surface of the one or more hydrogen-selective membranes. Permeate stream 176 may be formed from at least a portion of the mixed gas stream that passes through the hydrogen-separation region to permeate region 162. Byproduct stream 184 may be formed from at least a portion of the mixed gas stream that does not pass through the hydrogen-separation region. In some embodiments, byproduct stream 184 may contain a portion of the hydrogen gas present in the mixed gas stream. The hydrogen-separation region also may be configured to trap or otherwise retain at least a portion of the other gases, which may then be removed as a byproduct stream as the separation region is replaced, regenerated, or otherwise recharged.

In FIG. 3, streams 166, 176, 178, and/or 184 may include more than one actual stream flowing into or out of hydrogen purification device 144. For example, the hydrogen purification device may receive a plurality of mixed gas streams 168, a single mixed gas stream 168 that is divided into two or more streams prior to contacting hydrogen-separation region 146, a single stream that is delivered into internal volume 150, etc. Thus, enclosure 148 may include more than one input port 164, product output port 174, sweep gas port 180, and/or byproduct output port 182.

The hydrogen-selective membranes may be formed of any hydrogen-permeable material suitable for use in the operating environment and parameters in which the hydrogen purification device is operated. Examples of hydrogen purification devices are disclosed in U.S. Pat. Nos. 5,997,594 and 6,537,352, the complete disclosures of which are hereby incorporated by reference for all purposes. In some embodiments, the hydrogen-selective membranes may be formed from at least one of palladium and a palladium alloy. Examples of palladium alloys include alloys of palladium with copper, silver, and/or gold. Examples of various membranes, membrane configuration, and methods for preparing membranes and membrane configurations are disclosed in U.S. Pat. Nos. 6,152,995; 6,221,117; 6,319,306; and 6,537,352, the complete disclosures of which are hereby incorporated by reference for all purposes.

In some embodiments, a plurality of spaced-apart hydrogen-selective membranes 186 may be used in a hydrogen-separation region to form at least a portion of a hydrogen-separation assembly 192. When present, the plurality of membranes may collectively define one or more membrane assemblies 194. In such embodiments, the hydrogen-separation assembly may generally extend from first portion 154 to second portion 156. Thus, the first and second portions may effectively compress the hydrogen-separation assembly. In some embodiments, enclosure 148 may additionally, or alternatively, include end plates (or end frames) coupled to opposite sides of a body portion. In such embodiments, the end plates may effectively compress the hydrogen-separation assembly (and other components that may be housed within the enclosure) between the pair of opposing end plates.

Hydrogen purification using one or more hydrogen-selective membranes is typically a pressure-driven separation process in which the mixed gas stream is delivered into contact with the mixed gas surface of the membranes at a higher pressure than the gases in the permeate region of the hydrogen-separation region. The hydrogen-separation region may, in some embodiments, be heated via any suitable mechanism to an elevated temperature when the hydrogen-separation region is utilized to separate the mixed gas stream into the permeate and byproduct streams. Examples of suitable operating temperatures for hydrogen purification using palladium and palladium allow membranes include temperatures of at least 275° C., temperatures of at least 325° C., temperatures of at least 350° C., temperatures in the range of 275-500° C., temperatures in the range of 275-375° C., temperatures in the range of 300-450° C., temperatures in the range of 350-450° C., etc.

Figure 4:
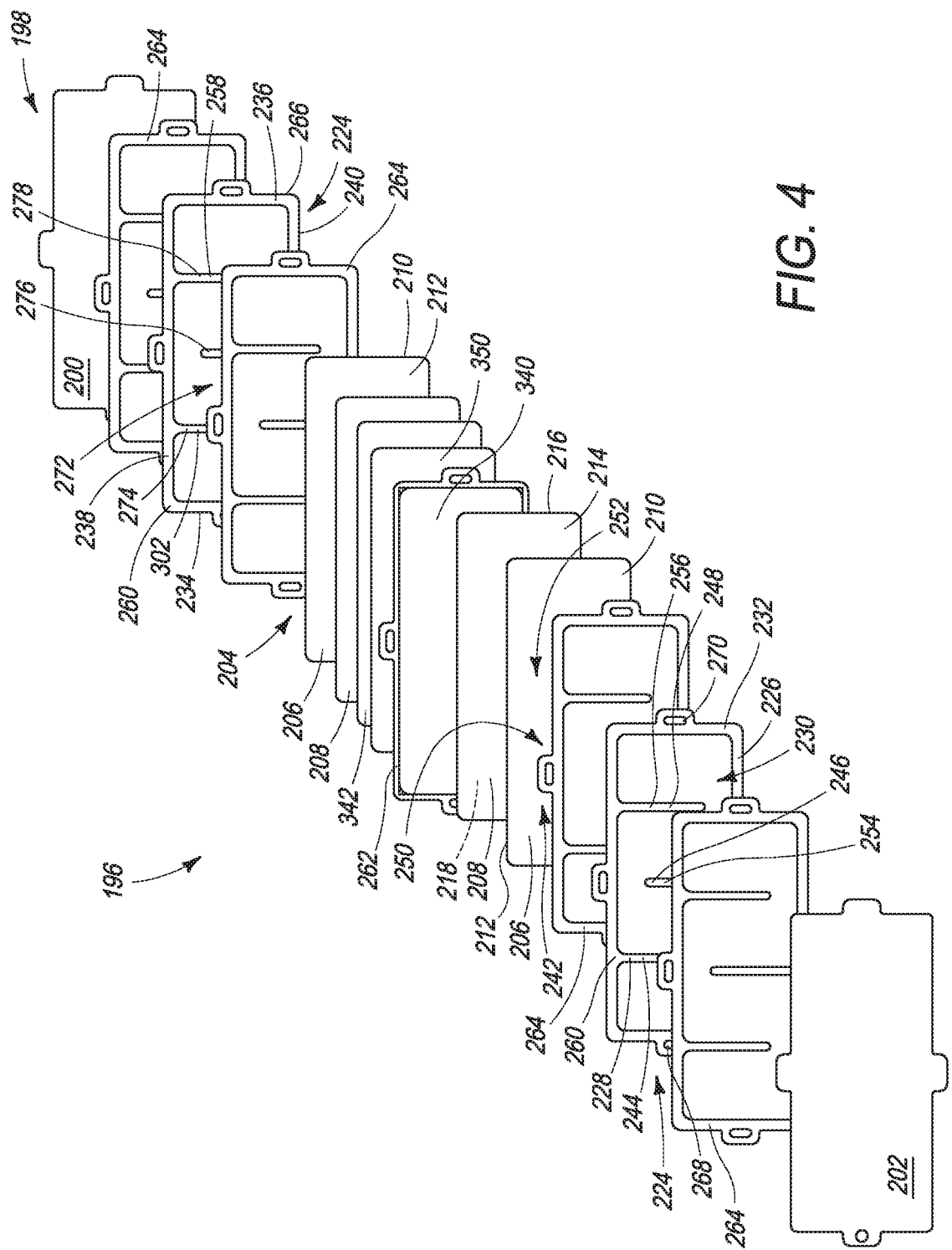
FIG. 4 is an exploded isometric view of an example of the hydrogen purification device of FIG. 3.

An example of hydrogen purification device 144 is generally indicated at 196 in FIG. 4. Unless specifically excluded, hydrogen purification device 196 may include one or more components of other hydrogen purification devices and/or purification regions described in this disclosure. Hydrogen purification device 196 may include a shell or enclosure 198, which may include a first end plate or end frame 200 and a second end plate or end frame 202. The first and second end plates may be configured to be secured and/or compressed together to define a sealed pressure vessel having an interior compartment 204 in which the hydrogen-separation region is supported. The first and second end plates may include input, output, sweep gas, and byproduct ports (not shown) similar to hydrogen purification device 144.

Hydrogen purification device 196 also may include at least one hydrogen-selective membrane 206 and at least one microscreen structure 208. The hydrogen-selective membrane may be configured to receive at least part of the mixed gas stream from the input port and to separate the mixed gas stream into at least part of the permeate stream and at least part of the byproduct stream. Hydrogen-selective membrane 206 may include a feed side 210 and a permeate side 212. At least part of the permeate stream being formed from the portion of the mixed gas stream that passes from the feed side to the permeate side, with the remaining portion of the mixed gas stream, which remains on the feed side, forming at least part of the byproduct stream. In some embodiments, hydrogen-selective membrane 206 may be secured to at least one membrane frame (not shown), which may then be secured to the first and second end frames.

Microscreen structure 208 may include any suitable structure configured to support the at least one hydrogen-selective membrane. For example, the microscreen structure may include generally opposed surfaces 214 and 216 configured to provide support to permeate side 212, and a plurality of fluid passages 218 extending between the opposed surfaces which allows the permeate stream to flow through the microscreen structure, as shown in FIG. 4. In some embodiments, the microscreen structure may include a non-porous metal sheet 220 having a plurality of apertures 222 that provide fluid passages 218. The thickness of the metal sheet may range from 0.001 inches to 0.020 inches. Apertures may be circular with diameters that range from about 0.003 inches to 0.020 inches with aperture center to center spacing ranging from about 0.005 inches to 0.025 inches. Microscreen structure 208, such as non-porous metal sheet 220, may include any suitable materials. For example, the microscreen structure may include stainless steel, such as stainless steel containing an aluminum oxide layer configured to prevent intermetallic diffusion between the stainless steel and the at least one hydrogen-selective membrane.

Figure 5:
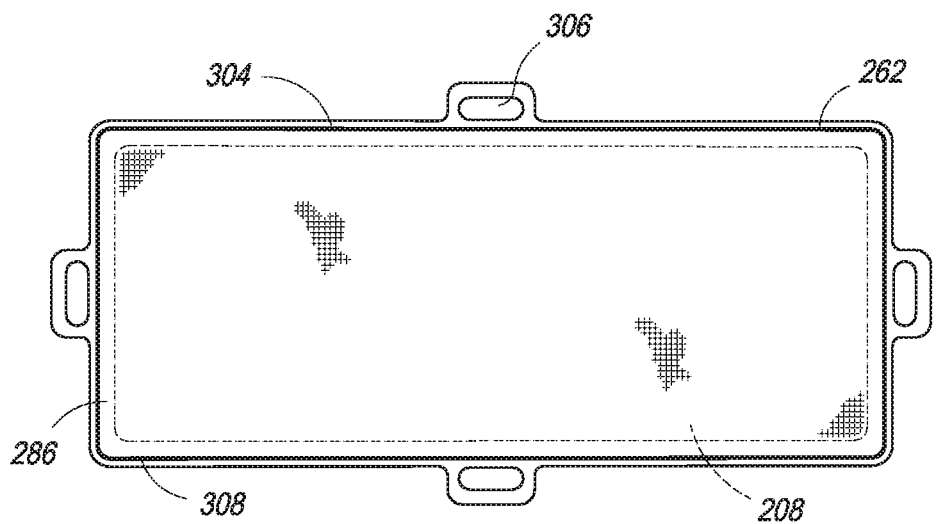
FIG. 5 is a top view of an example of a permeate frame and a microscreen structure of the hydrogen purification device of FIG. 4.

In some embodiments, the microscreen structure may include stainless steel 303 (aluminum modified), 17-7 PH, 14-8 PH, and/or 15-7 PH. In some embodiments, the stainless steel may include about 0.6 to about 1.5 weight % of aluminum. In some embodiments, microscreen structure 208 may include carbon steel, copper or copper alloys, aluminum or aluminum alloys. Microscreen structure 208 may be sized to be contained (such as entirely contained) within the open region of the permeate frame and/or supported by the membrane support structure within that open region, as shown in FIG. 5. In other words, the microscreen structure may be sized not to contact the perimeter shell of the permeate frame when the microscreen structure and the permeate frame are secured or compressed to the first and second end frames.

Alternatively, the microscreen structure may be supported by and/or secured to a non-porous perimeter wall portion or frame (not shown), such as to the perimeter shell of the permeate frame. When the microscreen structure is secured to a non-porous perimeter wall portion, the microscreen structure may be referred to as a "porous central area portion." Examples of other microscreen structures are disclosed in U.S. Patent Application Publication No. 2010/0064887, the complete disclosure of which is hereby incorporated by reference for all purposes.

Hydrogen purification device 196 also may include a plurality of plates or frames 224 disposed between and secured to the first and/or second end frames. The frames may include any suitable structure and/or may be any suitable shape(s), such as square, rectangular, or circular. For example, frames 224 may include a perimeter shell 226 and at least a first support member 228, as shown in FIG. 4. The perimeter shell may define an open region 230 and a frame plane 232. Additionally, perimeter shell 226 may include first and second opposed sides 234 and 236, and third and fourth opposed sides 238 and 240, as shown in FIG. 4.

First support member 228 may include any suitable structure configured to support a first portion 242 of hydrogen-selective membrane 206, as shown in FIG. 4. For example, the first support members of the plurality of frames may be co-planar with each other (or with other first support members of other frames of the plurality of frames) within a first support plane 244 to support first portion 242 of the hydrogen-selective membrane, as shown in FIG. 4. In other words, the first support member of each frame of the plurality of frames may mirror the first support member of the other frames of the plurality of frames. The first support member may have any suitable orientation to frame plane 232. For example, first support plane 244 may be perpendicular to the frame plane, as shown in FIG. 4. Alternatively, the first membrane support plane may intersect but not be perpendicular to frame plane 232.

In some embodiments, frames 224 may include a second support member 246 and/or third support member 248, which may include any suitable structure configured to support a second portion 250 and/or a third portion 252 of hydrogen-selective membrane 206, as shown in FIG. 4. For example, the second support members of the plurality of frames may be co-planar with each other (or with other second support members of the plurality of frames) within a second support plane 254 to support second portion 250 of the hydrogen-selective membrane. Additionally, the third support members of the plurality of frames may be co-planar with each other (or with other third support members of the plurality of frames) within a third support plane 256 to support third portion 252 of the hydrogen-selective membrane. In other words, the second support member of each frame of the plurality of frames may mirror the second support member of the other frames of the plurality of frames, while the third support member of each frame of the plurality of frames may mirror the third support member of the other frames of the plurality of frames. The second and/or third support planes may have any suitable orientation to frame plane 232. For example, second support plane 254 and/or third support plane 256 may be perpendicular to the frame plane, as shown in FIG. 4. Alternatively, the second and/or third support planes may intersect but not be perpendicular to frame plane 232.

Second support member 246 and/or third support member 248 may have any suitable orientation to first support member 228. For example, first support member 228 may extend into open region 230 from third side 238 of perimeter shell 226; second support member 246 may extend into the open region from fourth side 240 (which is opposed from the third side) of the perimeter shell; and third support member 248 may extend into the open region from the third side. Alternatively, the first, second, and/or third support members may extend into the open region from the same side, such as from the first, second, third, or fourth sides of the perimeter shell. In some embodiments, the first, second, and/or third support members may extend into the open region from the first side and/or second side (which is opposed from the first side) of the perimeter shell.

The first, second, and/or third support members may, for example, be in the form of one or more projections or fingers 258 attached to the perimeter shell and/or formed with the perimeter shell. The projections may extend from the perimeter shell in any suitable direction(s). The projections may be the full thickness of the perimeter shell or may be less than the full thickness of that shell. The projections of each frame of frames 224 may be compressed against the hydrogen-selective membrane thereby locking the membrane in place and reducing the impact of expansion of the hydrogen-selective membrane due to hydrogen dissolution. In other words, the projections of frames 224 may support the hydrogen-selective membrane by being stacked extension(s) of the end frames within the first and/or second membrane support plane. In some embodiments, projection(s) 258 may include one or more receptacles or apertures (not shown) configured to receive at least one fastener (not shown) to secure frames 224 to the first and/or second end frames.

Frames 224 may include at least one feed frame 260, at least one permeate frame 262, and a plurality of gaskets or gasket frames 264, as shown in FIG. 4. Feed frame 260 may be disposed between one of the first and second end frames and at least one hydrogen-selective membrane 206, or between two hydrogen-selective membranes 206. The feed frame may include a feed frame perimeter shell 266, a feed frame input conduit 268, a feed frame output conduit 270, a feed frame open region 272, at least a first feed frame support member 274, as shown in FIG. 4. In some embodiments, the feed frame may include a second feed frame support member 276 and/or a third feed frame support member 278.

Figure 6:
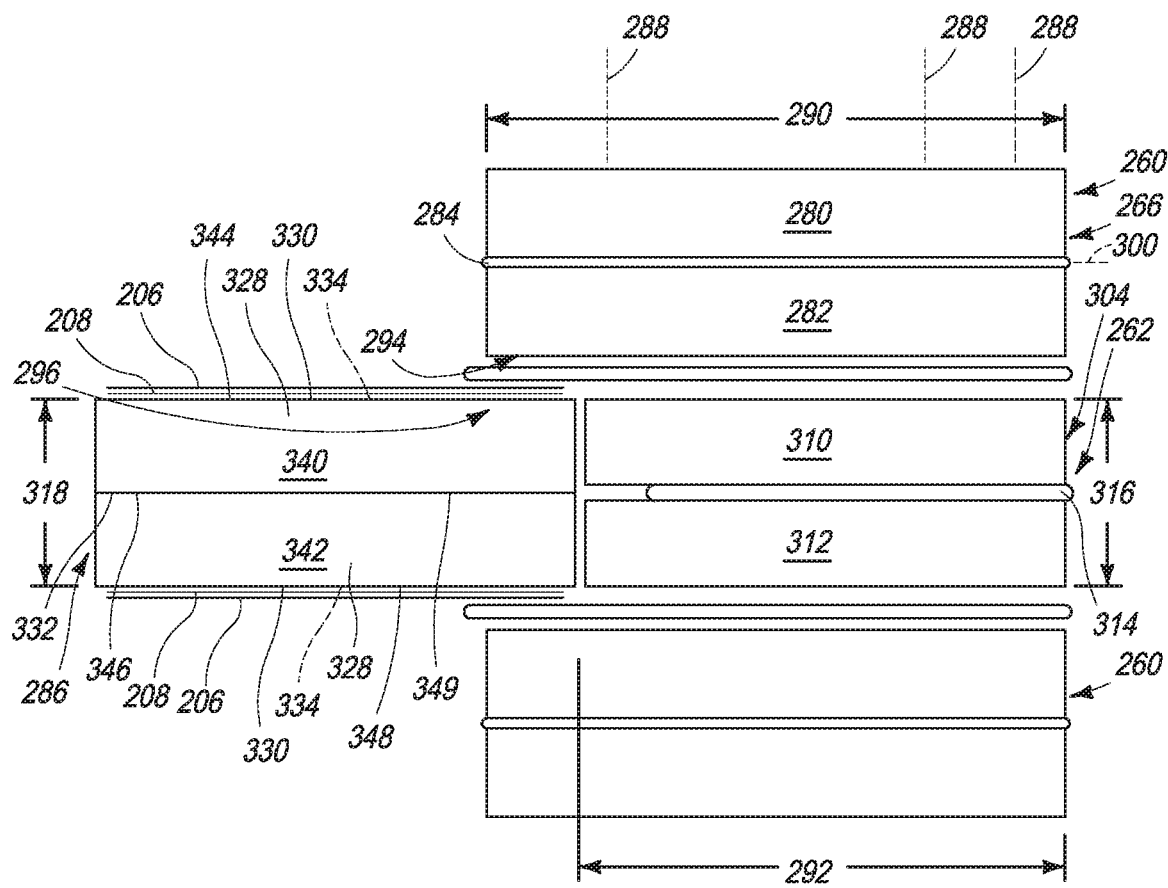
FIG. 6 is a partial sectional view of the hydrogen purification device of FIG. 4, showing an example of a perimeter shell of a feed frame, hydrogen-selective membranes, microscreen structures, a perimeter shell of a permeate frame, and a membrane support structure of the permeate frame.

Feed frame perimeter shell 266 may include any suitable structure. For example, the feed frame perimeter shell may include a first section or first perimeter shell 280 and a second section or second perimeter shell 282, as shown in FIG. 6. Please note that the components of FIG. 6 have been exaggerated for illustration purposes and may not reflect the relative dimensions of those components. The first and second sections may be first and second halves of the perimeter shell, or may be any suitable portions of that perimeter shell. Additionally, the first and/or second sections may include channels or grooves (not shown) in any suitable relationship with each other, such as offset from each other. First section 280 and second section 282 may be joined via any suitable method(s) to form a gas-tight seal between those sections. For example, a feed frame gasket 284 may be used between those sections. Alternatively, the first and second sections may be brazed together or layering metal(s) may be used to join the first and second sections as described in U.S. Patent Application Publication No. 2013/0011301. The complete disclosure of which is hereby incorporated by reference for all purposes.

Additionally, feed frame perimeter shell 266 may include any suitable dimensions configured to support other components of hydrogen purification device 196. For example, the feed frame perimeter shell may be sized such that it supports the perimeter shell of permeate frame(s) 262 and membrane support structure(s) 286 of those frame(s) along a plurality of feed frame support planes 288. For example, perimeter shell 266 may have a width 290 that is larger than a width 292 of the perimeter shell of permeate frame 262 such that at least a portion 294 of the perimeter shell supports a portion 296 of membrane support structure 286, as shown in FIG. 6. In other words, feed frame perimeter shell may lock membrane support structure in place and serve as a stop for that support structure. The feed frame support planes may have any suitable orientation to a feed frame plane 300. For example, the feed frame support planes may be perpendicular to the feed frame plane, as shown in FIG. 6. Alternatively, the feed frame support planes may intersect but not be perpendicular to feed frame plane 300.

The feed frame input conduit may be formed on the feed frame perimeter shell and/or be configured to receive at least part of the mixed gas stream from the input port. Feed frame output conduit 270 may be formed on the feed frame perimeter shell and/or be configured to receive the remaining portion of the mixed gas stream that remains on feed side 210 of hydrogen-selective membrane 206. Feed frame open region 272 may be disposed between the feed frame input and output conduits. Feed frame perimeter shell 266 may include a plurality of grooves or channels (not shown) fluidly connecting the input and output conduits with the feed frame open region. The channels may be formed on the perimeter shell via any suitable method(s) and/or may have any suitable orientation(s), such as angled orientations which may induce mixing in feed frame open region 260.

The first, second, and/or third feed frame support members may include any suitable structure configured to support the first, second, and/or third portions of at least one hydrogen-selective membrane and/or may mirror the first, second, and/or third support members of other frames, as discussed above. Additionally, the first, second, and/or third feed frame support members may include any suitable structure configured to change direction of flow of at least part of the mixed gas stream as it flows across the feed frame open region between the input and output conduits. The first and/or second feed frame support members also may be configured to promote turbulence or mixing within the feed frame open region. For example, without the first and/or second feed frame support members, flow of at least part of the mixed gas stream across the feed frame open region between the input and output conduits may move in at least a first direction (not shown). The first and/or second feed frame membrane support structures may be configured to change the flow of at least part of the mixed gas stream from the at least a first direction to at least a second direction (not shown) that is different from the first direction.

The first, second, and/or third feed frame support members may, for example, be in the form of at least one feed frame projection or finger 302 attached to the feed frame perimeter shell and/or formed with the feed frame perimeter shell. The feed frame projection(s) may extend from the perimeter shell in any suitable direction(s). For example, the feed frame projection(s) may extend from the feed frame perimeter shell in a direction that is generally perpendicular (and/or generally parallel) to the direction in which at least part of the mixed gas stream flows from the input conduit toward the feed frame open region. For example, if the flow of the mixed gas stream from the input conduit toward the feed frame open region is generally in a horizontal direction, the feed frame projection(s) may extend from the feed frame perimeter shell in generally a vertical direction and/or a horizontal direction.

Permeate frame 262 may be positioned such that the at least one hydrogen-selective membrane is disposed between one of the first and second end frames and the permeate frame or between two hydrogen-selective membranes. The permeate frame may include a permeate frame perimeter shell 304, a permeate frame output conduit 306, a permeate frame open region 308, and membrane support structure 286, as shown in FIG. 5.

The permeate frame perimeter shell may include any suitable structure. For example, the permeate frame perimeter shell may include a first section or first perimeter shell 310 and a second section or second perimeter shell 312, as shown in FIG. 6. The first and second sections may be first and second halves of the perimeter shell, or may be any suitable portions of that perimeter shell. Additionally, the first and/or second sections may include channels or grooves (not shown) in any suitable relationship with each other, such as offset from each other. First section 310 and second section 312 may be joined via any suitable method(s) to form a gas-tight seal between those sections. For example, a permeate frame gasket 314 may be used between those sections. The permeate frame gasket may be configured such that, when permeate frame 262 is secured to the first and second end frames, a thickness 316 of the permeate frame perimeter shell matches or substantially matches (identical to or substantially identical to) a thickness 318 of the membrane support structure, as shown in FIG. 6 and further discussed below.

Alternatively, the first and second sections may be brazed together or layering metal(s) may be used to join the first and second sections as described in U.S. Patent Application Publication No. 2013/0011301. The complete disclosure of which is hereby incorporated by reference for all purposes.

Figure 7:
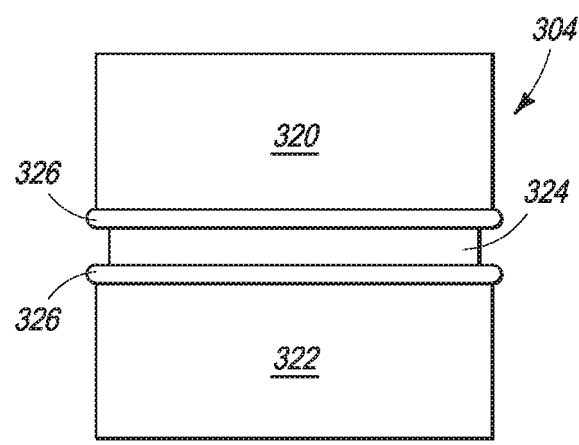
FIG. 7 is a partial sectional view of another example of a perimeter shell of a permeate frame of the hydrogen purification device of FIG. 4.

In some embodiments, permeate frame perimeter shell 304 may include a first section 320, a second section 322, and a third section 324 disposed between the first and second sections, as shown in FIG. 7. Those sections may be first, second, and third thirds of the perimeter shell, or may be any suitable portions of that perimeter shell. Additionally, the first, second, and/or third sections may include channels or grooves (not shown) in any suitable relationship with each other, such as offset from each other. Please note that the components of FIG. 7 have been exaggerated for illustration purposes and may not reflect the relative dimensions of those components.

First section 320, second section 322, and third section 324 may be joined via any suitable method(s) to form a gas-tight seal between those sections. For example, permeate frame gaskets 326 may be used between those sections.

The permeate frame gaskets may be configured such that, when permeate frame 262 is secured to the first and second end frames, thickness 316 of the permeate frame perimeter shell matches or substantially matches (identical to or substantially identical to) thickness 318 of the membrane support structure, as shown in FIG. 6. Alternatively, the first, second, and/or third sections may be brazed together or layering metal(s) may be used to join the first, second, and/or third sections as described in U.S. Patent Application Publication No. 2013/0011301. The complete disclosure of which is hereby incorporated by reference for all purposes.

Output conduit 306 may be formed on permeate frame perimeter shell 282 and/or be configured to receive the permeate stream from membrane support structure 286, permeate frame open region 308, and/or the hydrogen-selective membrane(s). Perimeter shell 282 may include a plurality of grooves or channels (not shown) fluidly connecting output conduit 284 with the permeate frame open region and/or the membrane support structure. The channels may be formed on perimeter shell 282 via any suitable method(s) and/or may have any suitable orientation(s), such as angled orientations.

Membrane support structure 286 may include any suitable structure configured to support the at least one hydrogen-selective membrane, such as the first, second, third, and/or other portions of the hydrogen-selective membrane. When hydrogen purification device 196 includes microscreen structure 208 disposed between hydrogen-selective membrane 206 and membrane support structure 286 as in FIG. 6, the membrane support structure may be configured to support the microscreen structure and, indirectly, the hydrogen-selective membrane. In some embodiments, the membrane support structure may include first, second, and/or third support members (not shown) similar to one or more of the other frames. Alternatively, membrane support structure 288 may include a plurality of membrane support plates 328, as shown in FIG. 6. The membrane support plates may span any suitable portion(s) of the open region, such as at least a substantial portion of the open region. Additionally, the membrane support plates may be solid, flat or planar, free from perforations or holes (or without perforations or holes), free from bumps and/or protrusions (or without bumps and/or protrusions), and/or may be incompressible (or substantially incompressible). Moreover, the membrane support plates may not be attached (or free from attachment) to the permeate frame perimeter shell. In other words, only the feed frames may lock the membrane support structure in place within the open region of the permeate frame perimeter shell when the feed frames are secure to the first and second end plates. Furthermore, the membrane support plates may be made of any suitable material(s), such as stainless steel.

Figure 8:
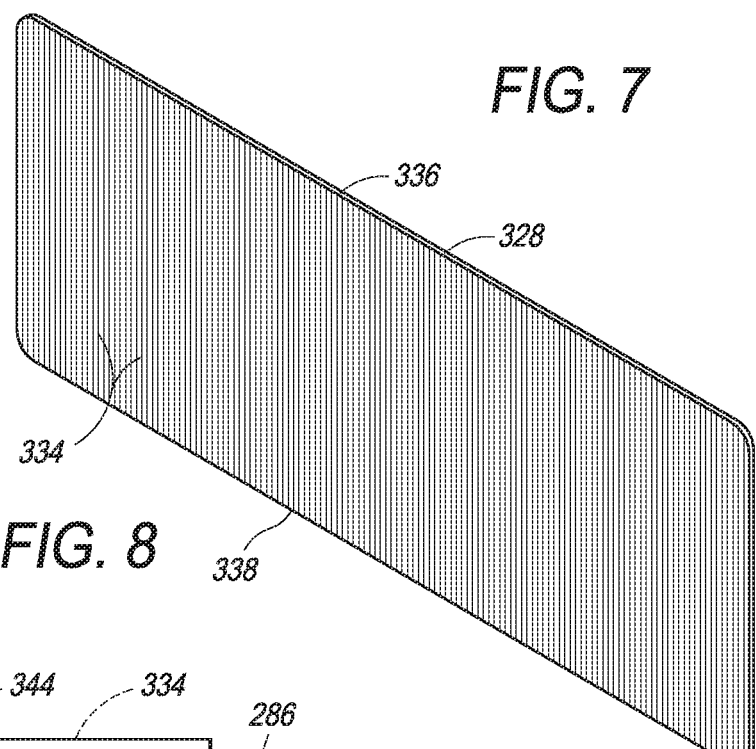
FIG. 8 is an isometric view of an example of a membrane support plate of a membrane support structure of a permeate frame of the hydrogen purification device of FIG. 4.

Membrane support plates 328 may include a first face (or surface) 330 and a second opposed face (or opposed surface) 332, as shown in FIG. 6. The membrane support plates may include a plurality of microgrooves 334, as shown in FIG. 8, which may include any suitable structure that provides one or more flow paths for the permeate stream. When membrane support plates 328 include surface microgrooves, those plates may be referred to as "surface-grooved plates." The microgrooves may have any suitable orientation(s), such as parallel to each other. Additionally, microgrooves 334 may extend from a first edge 336 to a second opposed edge 338 of the membrane support plates, as shown in FIG. 8 (or a third edge to a fourth opposed edge). Alternatively, one or more of the microgrooves may extend from the first edge to prior to the second edge, from the second edge to prior to the first edge, between but not including the first and second edges, etc. Moreover, microgrooves 334 may be on only the first face, on only the second face, or on both the first and second faces. Furthermore, the microgrooves may be included along an entire length or width of the membrane support plates (as shown in FIG. 8) or may be along any suitable portion(s) of that length or width, such as 25%, 50%, or 75% of the length or width.

Microgrooves 334 may have any suitable dimensions. For example, the microgrooves may have a width between 0.005 inches to 0.020 inches (or preferably between 0.010 to 0.012 inches) and a depth between 0.003 to 0.020 inches (or preferably 0.008 to 0.012 inches). The microgrooves may be spaced at any suitable distance(s), such as 0.003 to 0.020 inches (or preferably 0.003 to 0.007 inches). The microgrooves may be manufactured by any suitable method(s), such as chemical etching, machining, and/or the like.

In some embodiments, membrane support structure 286 may include a first membrane support plate 340 and a second membrane support plate 342, as shown in FIG. 6. The first membrane support plate may include a first face 344 and a second opposed face 346. Second membrane support plate 342 may include a first face 348 and a second opposed face 349. The first face of the first and/or second membrane support plates may include microgrooves 334. Additionally, the second face of the first and second membrane support plates may face toward each other. In other words, the first and second membrane support plates may be stacked in the membrane support structure such that the second face of the first membrane support plate faces the second face of the second membrane support plate, and/or vice-versa. In some embodiments, the second face of the first membrane support plate may contact the second face of the second membrane support plate.

Figure 9:
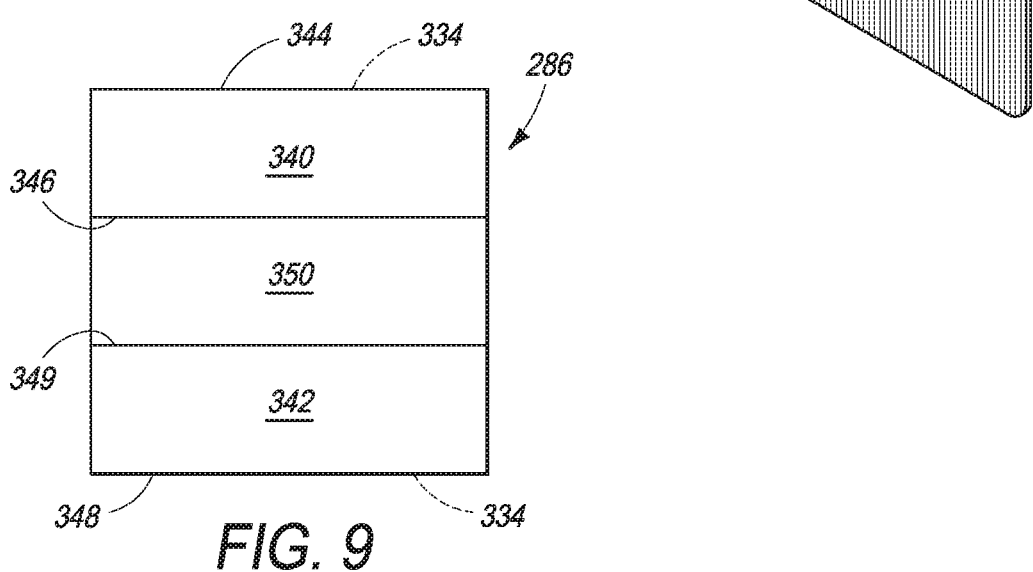
FIG. 9 is a sectional view of another example of a membrane support structure of the hydrogen purification device of FIG. 4.

In some embodiments, the membrane support structure may include a third membrane support plate 350, which may be disposed between the first and second membrane support plates as shown in FIG. 9. Please note that the components of FIG. 9 have been exaggerated for illustration purposes and may not reflect the relative dimensions of those components. Membrane support structure may include the first, second, and third membrane support plates stacked such that the third membrane support plate contacts the second faces of the first and/or second membrane support plates. When the third membrane support plate is disposed between the first and second membrane support plates, the third membrane support plate may sometimes be referred to as a "center plate." The third membrane support plate may be free from the microgrooves on either or both of its faces. The first, second, and third membrane support plates may have any suitable dimensions. For example, the first and second membrane support plates may be 0.060 inches, while the third membrane support plate may be 0.105 inches.

As discussed above, permeate frame gaskets 314 and/or 326 may be configured such that, when the permeate frame is secured and/or compressed to the first and second end frames, the thickness of the permeate frame matches the thickness of the membrane support structure. Those gaskets may yield a thickness before compression that is greater than the thickness of the membrane support structure. When flexible graphite gaskets are used for the permeate frame gasket(s) with compression limits of 15 to 50%, then the permeate frame gasket(s) may have a thickness before compression that results in a desired final thickness within those compression limits. When the permeate frame includes such gaskets, the permeate frame may sometimes be referred to as a "self-adjusting permeate frame." When the self-adjusting permeate frame is compressed during assembly by compression through the feed frames (such as under 1000 to 2000 psi compression) to form a gas-tight seal between the feed frame and the hydrogen-selective membrane, the compressive force of the feed frame against the permeate frame may be arrested when the feed frame contacts the hydrogen-selective membrane(s), the microscreen structure, and the membrane support structure, which together may form a generally incompressible group or stack of components.

As an example, if the membrane support structure has a thickness of 0.257 inches, then the permeate frame ideally would have a thickness that is exactly or about 0.257 inches. When the permeate frame perimeter shell includes two sections that are each, for example, 0.120 inches thick, then the permeate frame gasket should be configured to be 0.017 inches thick after compression. For example, a permeate frame gasket that is 0.030 inches thick before compression may be compressed within its compression limits to 0.017 inches after compression, which would produce a permeate frame thickness that matches the membrane support structure thickness. Although membrane support structure 286 is shown to include membrane support plates 328, the membrane support structure may include wire mesh and/or perforated metal sheet(s) (not shown).

Frames 224 also may include gaskets or gasket frames 264, as shown in FIG. 4. The gasket frames may include any suitable structure configured to provide fluid-tight interfaces among the other frames, such as between first and second end plates 200 and 202 and feed frames 260, between feed frames 260 and hydrogen-selective membranes 206, between the hydrogen-selective membranes (and the microscreen structures) and permeate frame 262. An example of a suitable gasket for gasket frames 264 is flexible graphite gaskets. Another example of a suitable gasket material is THERMICULITE® 866 sold by Flexitallic LP (Deer Park, Tex.). Although frames 224 are shown to include two feed frames 260 and a single permeate frame 262, the frames may include any suitable number of feed frames and permeate frames. Additionally, although hydrogen purification device 196 is shown to include two hydrogen-selective membranes 206, the device may include any suitable number of those membranes.

Although one or more of frames 224 are shown to include projections that extend only in the vertical direction or only in the horizontal direction, the frames may additionally, or alternatively, include projections that extend in the horizontal, vertical, and/or other suitable directions, such as diagonal, etc. Additionally, although one or more frames 224 are shown to include three projections, the frames may include one, two, four, five, or more projections. Moreover, although one or more frames 224 are shown to include projections that are co-planar within the first, second, and/or third support planes, the frames may additionally, or alternatively, include projections that are co-planar within fourth, fifth or more support planes.

Figure 10:
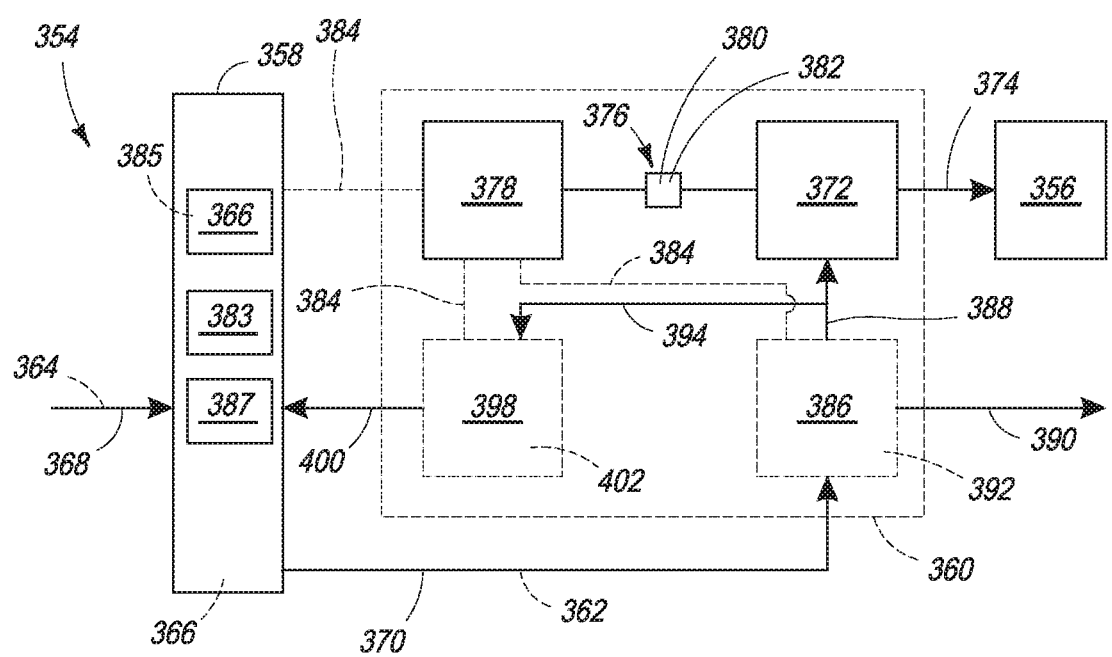
FIG. 10 is a partial schematic view of an additional example of a hydrogen generation assembly of FIG. 1.

Another example of hydrogen generation assembly 20 is generally indicated at 354 in FIG. 10. Unless specifically excluded, hydrogen generation assembly 354 may include one or more components of one or more other hydrogen generation assemblies described in this disclosure. The hydrogen generation assembly may provide or supply hydrogen to one or more hydrogen consuming devices 356, such as a fuel cell, hydrogen furnace, etc. Hydrogen generation assembly 354 may, for example, include a fuel processing assembly 358 and a product hydrogen management system 360.

Fuel processing assembly 358 may include any suitable structure configured to generate one or more product hydrogen streams 362 (such as one or more hydrogen gas streams) from one or more feed streams 364 via one or more suitable mechanisms, such as steam reforming, autothermal reforming, electrolysis, thermolysis, partial oxidation, plasma reforming, photocatalytic water splitting, sulfur-iodine cycle, etc. For example, fuel processing assembly 358 may include one or more hydrogen generator reactors 366, such as reformer(s), electrolyzer(s), etc. Feed stream(s) 364 may be delivered to the fuel processing assembly via one or more feed conduits 368 from one or more feedstock delivery systems (not shown).

Fuel processing assembly 358 may be configured to be operable among a plurality of modes, such as a run mode and a standby mode. In the run mode, the fuel processing assembly may produce or generate the product hydrogen stream(s) from the feed stream(s). For example, in the run mode, the feedstock delivery system may deliver the feed stream to the fuel processing assembly and/or may perform other operation(s). Additionally, in the run mode, the fuel processing assembly may receive the feed stream, may combust the fuel stream via the heating assembly, may vaporize the feed stream via the vaporization region, may generate the output stream via the hydrogen producing region, may generate the product hydrogen stream and the byproduct stream via the purification region, and/or may perform other operations.

In the standby mode, fuel processing assembly 358 may not produce the product hydrogen stream(s) from the feed stream(s). For example, in the standby mode, the feedstock delivery system may not deliver the feed stream to the fuel processing assembly and/or may not perform other operation(s). Additionally, in the standby mode, the fuel processing assembly may not receive the feed stream, may not combust the fuel stream via the heating assembly, may not vaporize the feed stream via the vaporization region, may not generate the output stream via the hydrogen producing region, may not generate the product hydrogen stream and the byproduct stream via the purification region, and/or may not perform other operations. The standby mode may include when the fuel processing assembly is powered down or when there is no power to the fuel processing assembly.

In some embodiments, the plurality of modes may include one or more reduced output modes. For example, fuel processing assembly 358 may produce or generate product hydrogen stream(s) 362 at a first output rate when in the run mode (such as at a maximum output rate or normal output rate), and produce or generate the product hydrogen stream(s) at second, third, fourth, or more rates that are lower (or higher) than the first rate when in the reduced output mode (such as at a minimum output rate).

Product hydrogen management system 360 may include any suitable structure configured to manage product hydrogen generated by fuel processing assembly 358. Additionally, the product hydrogen management system may include any suitable structure configured to interact with fuel processing assembly 358 to maintain any suitable amount of product hydrogen available for hydrogen consuming device(s) 356. For example, product hydrogen management system 360 may include a product conduit 370, a buffer tank 372, a buffer tank conduit 374, a sensor assembly 376, and a control assembly 378.

Product conduit 370 may be configured to fluidly connect fuel processing assembly 358 and buffer tank 372. Buffer tank 372 may be configured to receive product hydrogen stream 362 via product conduit 370, to retain a predetermined amount or volume of the product hydrogen stream, and/or to provide the product hydrogen stream to one or more hydrogen consuming devices 356. In some embodiments, the buffer tank may be a lower-pressure buffer tank. The buffer tank may be any suitable size based on one or more factors, such as expected or actual hydrogen consumption by the hydrogen consuming device(s), cycling characteristics of the hydrogen generator reactor, fuel processing assembly, etc.

In some embodiments, buffer tank 372 may be sized to provide enough hydrogen for a minimum amount of time of operation of the hydrogen consuming device(s) and/or for a minimum amount of time of operation for the fuel processing assembly, such as a minimum amount of time of operation for the vaporization region, hydrogen-producing region, and/or purification region. For example, the buffer tank may be sized for two, five, ten, or more minutes of operation of the fuel processing assembly. Buffer tank conduit 374 may be configured to fluidly connect buffer tank 372 and hydrogen consuming device(s) 356.

Sensor assembly 376 may include any suitable structure configured to detect and/or measure one or more suitable operating variables and/or parameters in the buffer tank and/or generate one or more signals based on the detected and/or measured operating variable(s) and/or parameter(s). For example, the sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the sensor assembly may detect one or more triggering events.

For example, sensor assembly 376 may include one or more sensors 380 configured to detect pressure, temperature, flowrate, volume, and/or other parameters. Sensors 380 may, for example, include at least one buffer tank sensor 382 configured to detect one or more suitable operating variables, parameters, and/or triggering events in the buffer tank. The buffer tank sensor may be configured to detect, for example, pressure in the buffer tank and/or generate one or more signals based on the detected pressure. For example, unless product hydrogen is being withdrawn from the buffer tank at a flow rate that is equal to, or greater than, the incoming flow rate into the buffer tank, the pressure of the buffer tank may increase and the tank sensor may detect the increase of pressure in the buffer tank.

Control assembly 378 may include any suitable structure configured to control fuel processing assembly 358 based, at least in part, on input(s) from sensor assembly 376, such as based, at least in part, on detected and/or measured operating variable(s) and/or parameter(s) by the sensor assembly. Control assembly 378 may receive input(s) only from sensor assembly 376 or the control assembly may receive input(s) from other sensor assemblies of the hydrogen generation assembly.

In some embodiments, fuel processing assembly 358 may include a plurality of heaters 383 adjacent to and/or in thermal communication with hydrogen generator reactor 366 (such as a hydrogen-producing region 385) and hydrogen-selective membranes 387 of fuel processing assembly 358. The heaters may be internal or external the enclosure of the fuel processing assembly. In those embodiments, the control assembly may communicate with and/or operate the heaters to maintain the hydrogen-producing region and/or the hydrogen-selective membrane(s) within predetermined temperature(s) or temperature range(s) when the fuel processing assembly is in the standby mode. For example, the heaters may maintain the hydrogen-producing region and hydrogen-selective membranes between 300 and 450° C.

When heaters are used to maintain the hydrogen-producing region and hydrogen-selective membranes at elevated temperatures, the standby mode may sometimes be referred to as a "hot standby mode" or "hot standby state." The fuel processing assembly may be able to produce the product hydrogen stream in the run mode from the hot standby mode within a time duration less than if the fuel processing assembly was starting from a shutdown mode or shutdown state. For example, the fuel processing assembly may be able to produce the product hydrogen stream within about 5 minutes when switched to the run mode from the hot standby mode.

Control assembly 378 may control only the fuel processing assembly, or the control assembly may control one or more other components of the hydrogen generation assembly. The control assembly may communicate with the sensor assembly, the fuel processing assembly, a product valve assembly (further described below), and/or a return valve assembly (further described below) via communication linkages 384. Communication linkages 384 may be any suitable wired and/or wireless mechanism for one- or two-way communication between the corresponding devices, such as input signals, command signals, measured parameters, etc.

Control assembly 378 may, for example, be configured to operate fuel processing assembly 358 between the run and standby modes based, at least in part, on the detected pressure in buffer tank 372. For example, control assembly 378 may be configured to operate the fuel processing assembly in the standby mode when the detected pressure in the buffer tank is above a predetermined maximum pressure, and/or to operate the fuel processing assembly in the run mode when the detected pressure in the buffer tank is below a predetermined minimum pressure.

The predetermined maximum and minimum pressures may be any suitable maximum and minimum pressures. Those predetermined pressures may be independently set, or set without regard to other predetermined pressure(s) and/or other predetermined variable(s). For example, the predetermined maximum pressure may be set based on the operating pressure range of the fuel processing assembly, such as to prevent overpressure in the fuel processing assembly because of back pressure from the product hydrogen management system. Additionally, the predetermined minimum pressure may be set based on the pressure required by the hydrogen consuming device(s). Alternatively, control assembly 378 may operate the fuel processing assembly to operate in the run mode within a predetermined range of pressure differentials (such as between the fuel processing assembly and the buffer tank and/or between the buffer tank and the hydrogen consuming device(s)), and in the standby mode when outside the predetermined range of pressure differentials.

In some embodiments, product hydrogen management system 360 may include a product valve assembly 386, which may include any suitable structure configured to manage and/or direct flow in product conduit 370. For example, the product valve assembly may allow the product hydrogen stream to flow from the fuel processing assembly to the buffer tank, as indicated at 388. Additionally, product valve assembly 386 may be configured to vent product hydrogen stream 362 from fuel processing assembly 358, as indicated at 390. The vented product hydrogen stream may be discharged to atmosphere and/or to a vented product hydrogen management system (not shown).

Product valve assembly 386 may, for example, include one or more valves 392 that are configured to operate between a flow position in which the product hydrogen stream from the fuel processing assembly flows through the product conduit and into the buffer tank, and a vent position in which the product hydrogen stream from the fuel processing assembly is vented. Valve(s) 392 may be positioned along any suitable portion(s) of the product conduit prior to the buffer tank.

Control assembly 378 may be configured to operate the product valve assembly based on, for example, input(s) from sensor assembly. For example, the control assembly may direct or control the product valve assembly (and/or valve(s) 392) to vent the product hydrogen stream from the fuel processing assembly when the fuel processing assembly is in the standby mode. Additionally, control assembly 378 may direct or control product valve assembly 386 (and/or valve(s) 392) to allow the product hydrogen stream to flow from the fuel processing assembly to the buffer tank when fuel processing assembly 358 is in the run mode and/or reduced output mode(s).

In some embodiments, product hydrogen management system 360 may include a return conduit 394 that fluidly connects buffer tank 372 and fuel processing assembly 358, as shown in FIG. 10. For example, the return conduit may fluidly connect the product conduit (such as adjacent the buffer tank) and the fuel processing assembly, which may allow the product hydrogen stream to return to the fuel processing assembly. The return conduit may fluidly connect to any suitable portion(s) of the fuel processing assembly. For example, when the fuel processing assembly includes hydrogen-producing region 78, one or more hydrogen purification (or hydrogen-selective) membrane(s) 116 and a reformate conduit 396 fluidly connecting the hydrogen-producing region and the hydrogen-selective membrane(s), return conduit 394 may fluidly connect the buffer tank and the reformate conduit, as shown in FIG. 2. Although the return conduit is shown to be connected downstream of hot gas filter 114, the return conduit may also be connected upstream of the hot gas filter and/or other suitable portions of the fuel processing assembly.

In embodiments that include return conduit 394, product hydrogen management system 360 also may include a return valve assembly 398, which may include any suitable structure configured to manage and/or direct flow in return conduit 394. For example, the return valve assembly may allow the product hydrogen stream to flow from the buffer tank to the fuel processing assembly, as indicated at 400.

Return valve assembly 398 may, for example, include one or more valves 402 that are configured to operate between an open position in which the product hydrogen stream from the buffer tank flows through the return conduit and into the fuel processing assembly, and a closed position in which the product hydrogen stream from the buffer tank does not flow through the return conduit and into the fuel processing assembly. Valve(s) 402 may be positioned along any suitable portion(s) of the return conduit prior to the fuel processing assembly.

Control assembly 378 may be configured to operate the return valve assembly based on, for example, input(s) from the sensor assembly. For example, the control assembly may direct or control the return valve assembly (and/or valve(s) 402) to allow the product hydrogen stream to flow from the buffer tank to the fuel processing assembly when fuel processing assembly 358 is in the standby mode. In some embodiments, the control assembly may direct or control the return valve assembly and/or valve(s) 402 to allow the product hydrogen stream to flow from the buffer tank to the fuel processing assembly for one or more predetermined duration(s) and/or one or more predetermined time interval(s) when the fuel processing assembly is in the standby mode. The predetermined duration(s) and/or time interval(s) may be based on preventing or minimizing the flow of product hydrogen stream to components of the fuel processing assembly other than the hydrogen-selective membrane(s) and/or preventing the flow of the product hydrogen stream to those components. For example, a predetermined duration may be 0.1 to 10 seconds that the valve is in the open position, while a predetermined interval may be from 1 to 12 hours. When the predetermined duration is between 0.1 to 10 seconds, the introduction of product hydrogen stream to the fuel processing assembly (such as upstream of the hydrogen-selective membrane(s)) may sometimes be referred to as a "hydrogen burp."

Figure 11:
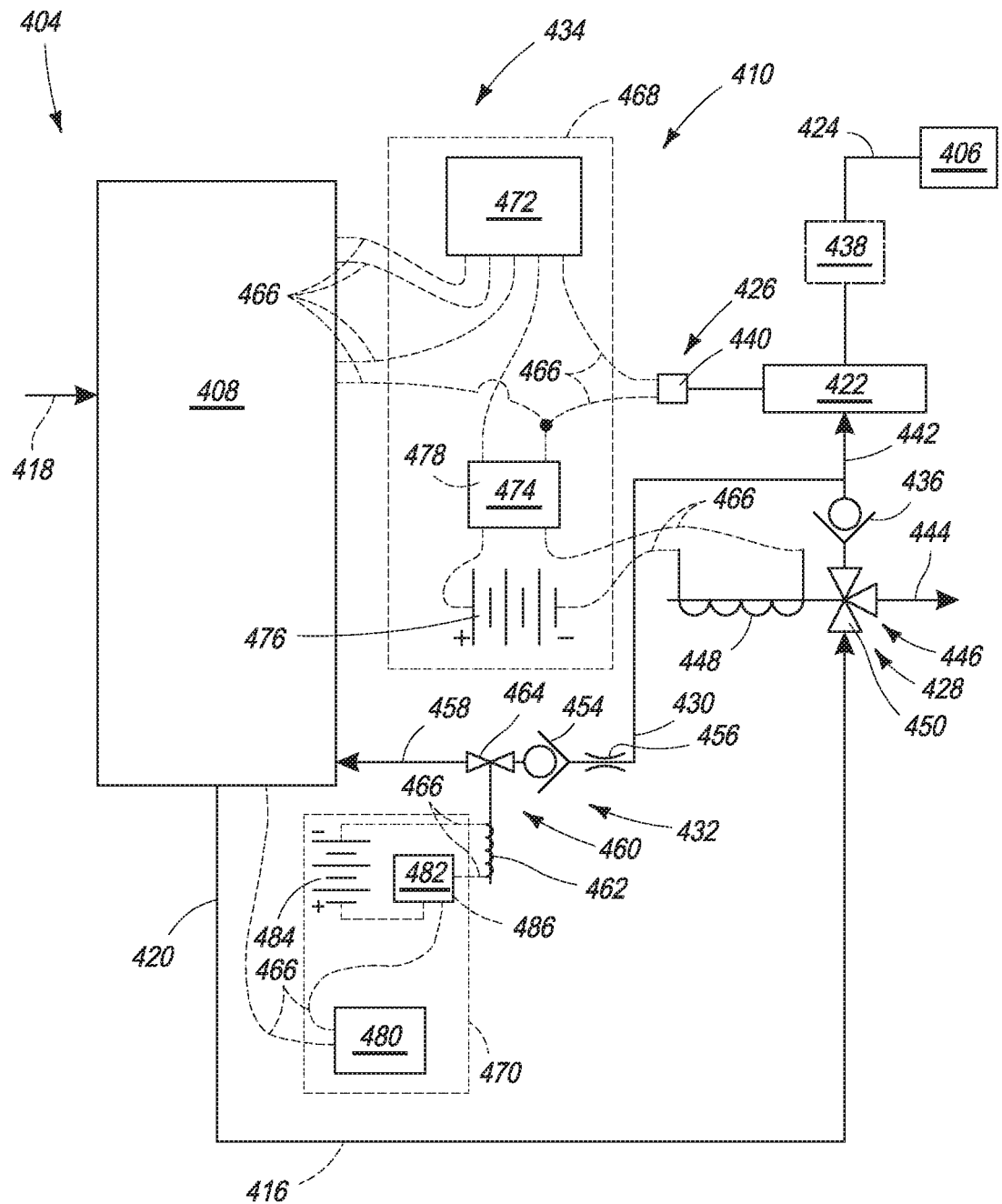
FIG. 11 is a partial schematic view of a further example of a hydrogen generation assembly of FIG. 1.

Another example of hydrogen generation assembly 20 is generally indicated at 404 in FIG. 11. Unless specifically excluded, hydrogen generation assembly 404 may include one or more components of one or more other hydrogen generation assemblies described in this disclosure. The hydrogen generation assembly may provide or supply hydrogen to one or more hydrogen consuming devices 406, such as a fuel cell, hydrogen furnace, etc. Hydrogen generation assembly 404 may, for example, include a fuel processing assembly 408 and a product hydrogen management system 410. Fuel processing assembly 408 may include any suitable structure configured to generate one or more product hydrogen streams 416 (such as one or more hydrogen gas streams) from one or more feed streams 418 via one or more suitable mechanisms.

Product hydrogen management system 410 may include any suitable structure configured to manage product hydrogen generated by fuel processing assembly 408. Additionally, the product hydrogen management system may include any suitable structure configured to interact with fuel processing assembly 408 to maintain any suitable amount of product hydrogen available for hydrogen consuming device(s) 406. For example, product hydrogen management system 410 may include a product conduit 420, a buffer tank 422, a buffer tank conduit 424, a buffer tank sensor assembly 426, a product valve assembly 428, a return conduit 430, a return valve assembly 432, and a control assembly 434.

Product conduit 420 may be configured to fluidly connect fuel processing assembly 408 with buffer tank 422. The product conduit may include any suitable number of valves, such as check valve(s) (such as check valve 436), control valve(s), and/or other suitable valves. Check valve 436 may prevent backflow from the buffer tank toward the fuel processing assembly. The check valve may open at any suitable pressures, such as 1 psi or less. Buffer tank 422 may be configured to receive product hydrogen stream 416 via product conduit 420, to retain a predetermined amount or volume of the product hydrogen stream, and/or to provide the product hydrogen stream to one or more hydrogen consuming devices 406.

Buffer tank conduit 424 may be configured to fluidly connect buffer tank 422 and hydrogen consuming device(s) 406. The buffer tank conduit may include any suitable number of valves, such as check valve(s), control valve(s), and/or other suitable valve(s). For example, the buffer tank conduit may include one or more control valves 438. Control valve 438 may allow isolation of the buffer tank and/or other components of the hydrogen generation assembly. The control valve may, for example, be controlled by control assembly 434 and/or other control assembly(ies).

Tank sensor assembly 426 may include any suitable structure configured to detect and/or measure one or more suitable operating variables and/or parameters in the buffer tank and/or generate one or more signals based on the detected and/or measured operating variable(s) and/or parameter(s). For example, the buffer tank sensor assembly may detect mass, volume, flow, temperature, electrical current, pressure, refractive index, thermal conductivity, density, viscosity, optical absorbance, electrical conductivity, and/or other suitable variable(s), and/or parameter(s). In some embodiments, the buffer tank sensor assembly may detect one or more triggering events. For example, buffer tank sensor assembly 426 may include one or more tank sensors 440 configured to detect pressure, temperature, flowrate, volume, and/or other parameters. Buffer tank sensors 440 may, for example, be configured to detect pressure in the buffer tank and/or generate one or more signals based on the detected pressure.

Product valve assembly 428 may include any suitable structure configured to manage and/or direct flow in product conduit 420. For example, the product valve assembly may allow the product hydrogen stream to flow from the fuel processing assembly to the buffer tank, as indicated at 442. Additionally, product valve assembly 428 may be configured to vent product hydrogen stream 416 from fuel processing assembly 408, as indicated at 444. The vented product hydrogen stream may be discharged to atmosphere and/or to a vented product hydrogen management system (not shown) including discharging vented product hydrogen back to the fuel processing assembly in addition to (or instead of) the return valve assembly.

Product valve assembly 428 may, for example, include a three-way solenoid valve 446. The three-way solenoid valve may include a solenoid 448 and a three-way valve 450. The three-way valve may be configured to move between a plurality of positions. For example, three-way valve 450 may be configured to move between a flow position and a vent position. In the flow position, the product hydrogen stream is allowed to flow from the fuel processing assembly to the buffer tank, as indicated at 442. In the vent position, the product hydrogen stream from the fuel processing assembly is vented, as indicated at 444. Additionally, the three-way valve may be configured to isolate the buffer tank from the product hydrogen stream when the valve is in the vent position. Solenoid 448 may be configured to move valve 450 between the flow and vent positions based on input(s) received from control assembly 434 and/or other control assembly(ies).

Return conduit 430 may be configured to fluidly connect buffer tank 422 and fuel processing assembly 408 (such as the reformate conduit of that fuel processing assembly). The return conduit may include any suitable number of valves, such as check valve(s) (such as check valve 454), control valve(s), and/or other suitable valves. Check valve 454 may prevent backflow from the fuel processing assembly toward the buffer tank. The check valve may open at any suitable pressures. In some embodiments, return conduit 430 may include a flow restriction orifice 456 configured to restrict flow through the return conduit. The flow restriction orifice may be upstream or downstream the solenoid valve of the return valve assembly. Additionally, flow restriction orifice 456 may be any suitable size, such as 0.005 inches to 0.035 inches, preferably 0.010 inches.

Return valve assembly 432 may include any suitable structure configured to manage and/or direct flow in return conduit 430. For example, the return valve assembly may allow the product hydrogen stream to flow from the buffer tank to the fuel processing assembly, as indicated at 458. Return valve assembly 432 may, for example, include a solenoid valve 460. The solenoid valve may include a solenoid 462 and a valve 464. That valve may be configured to move between a plurality of positions. For example, valve 464 may be configured to move between an open position and a closed position. In the open position, the product hydrogen stream is allowed to flow from the buffer tank to the fuel processing assembly, as indicated at 458. In the closed position, the product hydrogen stream is not allowed to flow (or restricted from flowing) from the buffer tank to the fuel processing assembly. Additionally, the valve may be configured to isolate the buffer tank when the valve is in the closed position. Solenoid 462 may be configured to move valve 464 between the open and closed positions based on input(s) received from control assembly 434 and/or other control assembly(ies).

Control assembly 434 may include any suitable structure configured to control fuel processing assembly 408, product valve assembly 428, and/or return valve assembly 432 based, at least in part, on input(s) from buffer tank sensor assembly 426, such as based, at least in part, on detected and/or measured operating variable(s) and/or parameter(s) by the buffer tank sensor assembly. Control assembly 434 may receive input(s) only from buffer tank sensor assembly 426 and/or the control assembly may receive input(s) from other sensor assemblies of the hydrogen generation assembly. Additionally, control assembly 434 may control only the fuel processing assembly, only the product valve assembly, only the return valve assembly, only both the fuel processing assembly and the product valve assembly, only both the fuel processing assembly and the return valve assembly, only both the product valve assembly and the return valve assembly, or the fuel processing assembly, product valve assembly and/or one or more other components of the hydrogen generation assembly. Control assembly 434 may communicate with the fuel processing assembly, the buffer tank sensor assembly, the product valve assembly, and/or the return valve assembly via communication linkages 466. Communication linkages 466 may be any suitable wired and/or wireless mechanism for one- or two-way communication between the corresponding devices, such as input signals, command signals, measured parameters, etc.

Control assembly 434 may, for example, be configured to operate fuel processing assembly 408 among or between the run and standby modes (and/or reduced output mode(s)) based, at least in part, on the detected pressure in buffer tank 438. For example, control assembly 434 may be configured to operate the fuel processing assembly in the standby mode when the detected pressure in the buffer tank is above a predetermined maximum pressure, to operate the fuel processing assembly in one or more reduced output mode(s) when the detected pressure in the buffer tank is below a predetermined maximum pressure and/or above a predetermined operating pressure, and/or to operate the fuel processing assembly in the run mode when the detected pressure in the buffer tank is below a predetermined operating pressure and/or predetermined minimum pressure. The predetermined maximum and minimum pressures and/or predetermined operating pressure(s) may be any suitable pressures. For example, the one or more of the above pressures may be independently set based on a desired range of pressures for the fuel processing assembly, product hydrogen in the buffer tank, and/or the pressure requirements of the hydrogen consuming device(s). Alternatively, control assembly 434 may operate the fuel processing assembly to operate in the run mode within a predetermined range of pressure differentials (such as between the fuel processing assembly and the buffer tank), and in the reduced output and/or standby mode when outside the predetermined range of pressure differentials.

Additionally, control assembly 434 may be configured to operate the product valve assembly based on, for example, input(s) from sensor assembly 426. For example, the control assembly may direct or control solenoid 448 to move three-way valve 450 to the vent position when the fuel processing assembly is in the standby mode. Additionally, control assembly 434 may direct or control the solenoid to move three-way valve 450 to the flow position when fuel processing assembly 408 is in the run mode.

Moreover, control assembly 434 may be configured to operate the return valve assembly based on, for example, input(s) from sensor assembly 426. For example, the control assembly may direct or control solenoid 462 to move valve 464 to the open position when the fuel processing assembly is in the standby mode. Control assembly 434 may move valve 464 to the open position at predetermined duration(s) and/or at predetermined interval(s). Additionally, control assembly 434 may direct or control solenoid 462 to move valve 464 to the closed position outside the predetermined durations and/or predetermined intervals and/or when the fuel processing assembly is in the run mode.

Control assembly 434 may include a first control mechanism 468 and a second control mechanism 470. The first control mechanism may be in communication with, for example, the fuel processing assembly, the buffer tank sensor assembly, and the product valve assembly, and/or may be configured to control the product valve assembly. Second control mechanism 470 may be in communication with, for example, the fuel processing assembly and the return valve assembly and/or may be configured to control the return valve assembly. Although control assembly 434 is shown to include first and second control mechanisms 468 and 470, the control assembly may include a single control mechanism configured to provide most or all of the functionality of the first and second control mechanisms.

First control mechanism 468 may, for example, include a first controller 472, a first switching device 474, and a first power supply 476. First controller 472 may have any suitable form, such as a computerized device, software executing on a computer, an embedded processor, programmable logic controller, an analog device, and/or functionally equivalent devices. Additionally, the first controller may include any suitable software, hardware, and/or firmware.

First switching device 474 may include any suitable structure configured to allow first controller 472 to control solenoid 448. For example, the switching device may include a first solid-state relay or first SSR 478. The first solid-state relay may allow first controller 472 to control solenoid 448 via first power supply 476. For example, when solenoid 448 is controlled with 24 volts, the solid-state relay may allow first controller 472 to use a voltage signal other than 24 volts (such as 5 volts, 12 volts, 48 volts, etc.) to control solenoid 448. First power supply 476 may include any suitable structure configured to provide power sufficient to control solenoid 448. For example, first power supply 476 may include one or more batteries, one or more solar panels, etc. In some embodiments, the power supply may include one or more electrical outlet connectors and one or more rectifiers (not shown). Although the first solenoid and first controller are described to operate at certain voltages, the first solenoid and first controller may operate at any suitable voltages.

Second control mechanism 470 may, for example, include a second controller 480, a second switching device 482, and a second power supply 484. Second controller 480 may have any suitable form, such as a computerized device, software executing on a computer, an embedded processor, programmable logic controller, an analog device, and/or functionally equivalent devices. Additionally, the controller may include any suitable software, hardware, and/or firmware. For example, second controller 480 may include a timer relay that provides a signal to solenoid 462 to move valve 464 to the open position for a predetermined duration and/or at predetermined time interval(s). The timer relay may be energized, for example, only when the fuel processing assembly is in the standby mode.

Second switching device 482 may include any suitable structure configured to allow second controller 480 to control solenoid 462. For example, the second switching device may include a second solid-state relay or second SSR 486. The second solid-state relay may allow second controller 480 to control solenoid 462 via second power supply 484. For example, when solenoid 462 is controlled with 24 volts, the solid-state relay may allow second controller 480 to use a voltage signal other than 24 volts (such as 5 volts, 12 volts, 48 volts, etc.) to control second solenoid 462. Second power supply 484 may include any suitable structure configured to provide power sufficient to control solenoid 462. For example, second power supply 484 may include one or more batteries, one or more solar panels, etc. In some embodiments, the second power supply may include one or more electrical outlet connectors and one or more rectifiers (not shown). Although the second solenoid and second controller are described to operate at certain voltages, the second solenoid and second controller may operate at any suitable voltages.

In some embodiments, the first and/or second control mechanisms (or components of those mechanisms) may be configured to control other components of the hydrogen generation assembly and/or may be incorporated with other control mechanisms and/or control assemblies. For example, the first and second control mechanisms may share a power supply. Additionally, the second control mechanism may be configured to control operation of heaters in thermal communication with the hydrogen-producing region and the hydrogen-selective membrane(s) and/or may be connected to a control assembly that controls those heaters.

Figure 12:
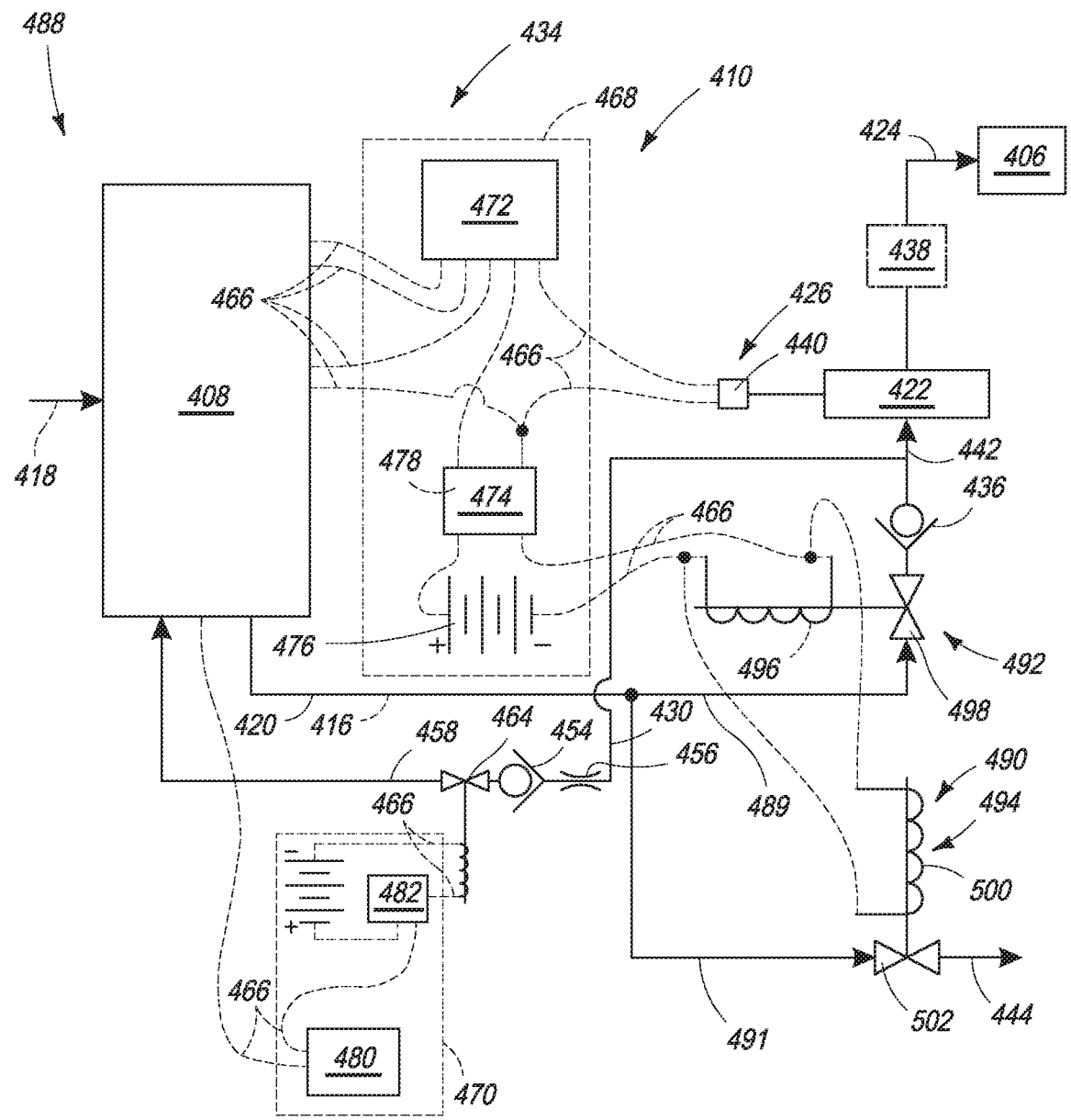
FIG. 12 is a partial schematic view of another example of a hydrogen generation assembly of FIG. 1.

Another example of hydrogen generation assembly 20 is generally indicated at 488 in FIG. 12. Unless specifically excluded, hydrogen generation assembly 488 may include one or more components of one or more other hydrogen generation assemblies described in this disclosure. The components of hydrogen generation assembly 488 that are similar or identical to components of hydrogen generation assembly 404 in FIG. 11 are provided the same reference numbers as the components of hydrogen generation assembly 404. Because those components have been previously discussed, this portion of the disclosure focuses on the components that are different from hydrogen generation assembly 404.

Product conduit 420 may include a flow portion or leg 489 and a vent portion or leg 491. Hydrogen generation assembly 488 may include a product valve assembly 490, which may include any suitable structure configured to manage and/or direct flow in product conduit 420. For example, the product valve assembly may allow product hydrogen stream 416 to flow from the fuel processing assembly to the buffer tank (as indicated at 442), and/or vent product hydrogen stream 416 from fuel processing assembly 408 (as indicated at 444). The vented product hydrogen stream may be discharged to atmosphere and/or to a vented product hydrogen management system (not shown).

Product valve assembly 490 may, for example, include a first solenoid valve 492 and a second solenoid valve 494. The first solenoid valve may include a first solenoid 496 and a first valve 498, while the second solenoid valve may include a second solenoid 500 and a second valve 502. The first valve may be configured to move between a plurality of positions, including a first open position and a first closed position. Additionally, the second valve may be configured to move between a plurality of positions, including a second open position and a second closed position.

When the first valve is in the open position, the product hydrogen stream is allowed to flow from the fuel processing assembly to the buffer tank. In contrast, when the first valve is in the closed position, buffer tank is isolated from the product hydrogen stream from the fuel processing assembly (or the product hydrogen stream from the fuel processing assembly is not allowed to flow to the buffer tank). When the second valve is in the open position, the product hydrogen stream from the fuel processing assembly is vented. In contrast, when the second valve is in the closed position, the product hydrogen stream from the fuel processing assembly is not vented.

First solenoid 496 may be configured to move first valve 498 between the open and closed positions based on input(s) received from control assembly 434. Additionally, second solenoid 500 may be configured to move second valve 502 between the open and closed position based on input(s) received from the control assembly.

Control assembly 434 may be configured to operate the product valve assembly based on, for example, input(s) from sensor assembly. For example, the control assembly may direct or control the first and/or second solenoids to move the first valve in the closed position and/or the second valve in the open position when the fuel processing assembly is in the standby mode. Additionally, control assembly 434 may direct or control the first and/or second solenoids to move the first valve in the open position and/or the second valve in the closed position when fuel processing assembly 408 is in the run mode and/or reduced output mode(s).

Hydrogen generation assemblies of the present disclosure may include one or more of the following:

First and second end frames including an input port configured to receive a mixed gas stream containing hydrogen gas and other gases.

First and second end frames including an output port configured to receive a permeate stream containing at least one of a greater concentration of hydrogen gas and a lower concentration of other gases than a mixed gas stream.

First and second end frames including a byproduct port configured to receive a byproduct stream containing at least a substantial portion of other gases.

At least one hydrogen-selective membrane disposed between and secured to first and second end frames.

At least one hydrogen-selective membrane having a feed side and a permeate side, at least part of a permeate stream being formed from a portion of a mixed gas stream that passes from the feed side to the permeate side, with the remaining portion of a mixed gas stream, which remains on the feed side, forming at least part of a byproduct stream.

A plurality of frames disposed between first and second end frames and at least one hydrogen-selective membrane and secured to the first and second end frame.

A plurality of frames including at least one permeate frame disposed between at least one hydrogen-selective membrane and a second end frame.

At least one permeate frame including a perimeter shell.

At least one permeate frame including an output conduit formed on a perimeter shell and configured to receive at least part of a permeate stream from at least one hydrogen-selective membrane.

At least one permeate frame including an open region surrounded by a perimeter shell.

At least one permeate frame including at least one membrane support structure.

At least one membrane support structure spanning at least a substantial portion of an open region.

At least one membrane support structure that is configured to support at least one hydrogen-selective membrane.

At least one membrane support structure including first and second membrane support plates.

First and second membrane support plates free from perforations.

First and second membrane support plates having a first face having a plurality of microgrooves configured to provide flow channels for at least part of a permeate stream.

First and second membrane support plates having a second face opposed to a first face.

First and second membrane support plates stacked in at least one membrane support structure.

First and second membrane support plates stacked in at least one membrane support structure such that a second face of the first membrane support plate faces a second face of the second membrane support plate.

Noncompressible first and second membrane support plates.

Flat first and second membrane support plates.

At least one feed frame disposed between a first end frame and at least one hydrogen-selective membrane.

At least one feed frame including a perimeter shell.

At least one feed frame including an input conduit formed on a perimeter shell of the at least one feed frame.

At least one feed frame including an input conduit configured to receive at least part of a mixed gas stream from the input port.

At least one feed frame including an output conduit formed on a perimeter shell of the at least one feed frame.

At least one feed frame including an output conduit configured to receive the remaining portion of at least part of a mixed gas stream that remains on a feed side of at least one hydrogen-selective membrane.

At least one feed frame including a feed frame open region surrounded by a perimeter shell of a feed frame and disposed between input and output conduits.

A perimeter shell of at least one feed frame being sized such that the perimeter shell of the at least one feed frame supports a perimeter shell of at least one permeate frame and a portion of at least one membrane support structure.

A perimeter shell of at least one feed frame being sized such that the perimeter shell of the at least one feed frame supports a perimeter shell of at least one permeate frame and a portion of at least one membrane support structure along a plurality of support planes that are perpendicular to the frame plane of each frame of a plurality of frames.

At least one microscreen structure disposed between at least one hydrogen-selective membrane and at least one permeate frame.

At least one microscreen structure configured to support at least one hydrogen-selective membrane.

At least one microscreen structure includes generally opposed surfaces configured to provide support to a permeate side.

At least one microscreen structure includes a plurality of fluid passages extending between opposed surfaces.

At least one microscreen structure being sized not to contact a perimeter shell of at least one permeate frame.

At least one microscreen structure being sized not to contact a perimeter shell when at least one microscreen structure and at least one permeate frame are secured to first and second end frames.

At least one membrane support structure including a third membrane support plate.

A third membrane support plate disposed between first and second membrane support plates.

A non-compressible third membrane support plate.

A flat third membrane support plate.

A third membrane support plate free from perforations.

A third membrane support plate free from microgrooves.

A perimeter shell of a permeate frame including first and second perimeter shells.

A perimeter shell of a permeate frame including a gasket disposed between first and second perimeter shells.

A gasket configured such that the thickness of a permeate frame perimeter shell matches the thickness of a membrane support structure.

A gasket configured such that, when a permeate frame is secured to first and second end frames, the thickness of a permeate frame perimeter shell matches the thickness of a membrane support structure.

A permeate frame perimeter shell including first, second, and third perimeter shells.

A permeate frame perimeter shell including a first gasket disposed between first and second perimeter shells.

A permeate frame perimeter shell including a second gasket disposed between second and third perimeter shells.

First and second gaskets configured such that the thickness of a permeate frame perimeter shell matches the thickness of a membrane support structure.

First and second gaskets configured such that, when a permeate frame is secured to first and second end frames, the thickness of the permeate frame perimeter shell matches the thickness of a membrane support structure.

First and second membrane support plates each having first and second opposed edges.

A plurality of microgrooves that extend from a first edge to a second edge.

A plurality of parallel microgrooves.

A fuel processing assembly configured to receive a feed stream.

A fuel processing assembly configured to be operable among a plurality of modes.

A fuel processing assembly configured to be operable among a plurality of modes, including a run mode in which the fuel processing assembly produces a product hydrogen stream from a feed stream, and a standby mode in which the fuel processing assembly does not produce the product hydrogen stream from the feed stream.

A hydrogen-producing region containing a reforming catalyst.

A hydrogen-producing region configured to receive a feed stream and produce a reformate stream.

One or more hydrogen-selective membranes configured to receive a reformate stream.

One or more hydrogen-selective membranes configured to produce at least part of a product hydrogen stream and a byproduct stream from a reformate stream.

A reformate conduit fluidly connecting a hydrogen-producing region and one or more hydrogen-selective membranes.

A buffer tank configured to contain a product hydrogen stream.

A product conduit fluidly connecting a fuel processing assembly and a buffer tank.

A return conduit fluidly connecting a buffer tank and a reformate conduit.

A tank sensor assembly configured to detect pressure in a buffer tank.

A return valve assembly configured to manage flow in a return conduit.

A return valve assembly including at least one valve.

At least one valve configured to operate between an open position in which a product hydrogen stream from a buffer tank flows through a return conduit and into a reformate conduit, and a closed position in which the product hydrogen stream from the buffer tank does not flow through the return conduit and into the reformate conduit.

A plurality of heaters in thermal communication with a hydrogen-producing region and one or more hydrogen-selective membranes.

A control assembly configured to operate a fuel processing assembly between run and standby modes.

A control assembly configured to operate a fuel processing assembly between run and standby modes based, at least in part, on detected pressure in a buffer tank.

A control assembly being configured to direct a return valve assembly to allow a product hydrogen stream to flow from a buffer tank to a reformate conduit.

A control assembly being configured to direct a return valve assembly to allow a product hydrogen stream to flow from a buffer tank to a reformate conduit when a fuel processing assembly is in a standby mode.

A control assembly configured to direct a return assembly to allow a product hydrogen stream to flow from a buffer tank to a reformate conduit at one or more predetermined time intervals.

A control assembly configured to direct a return assembly to allow a product hydrogen stream to flow from a buffer tank to a reformate conduit at one or more predetermined time intervals when a fuel processing assembly is in a standby mode.

A control assembly configured to direct a return assembly to allow a product hydrogen stream to flow from a buffer tank to a reformate conduit for a predetermined duration at one or more predetermined time intervals.

A control assembly configured to direct a return assembly to allow a product hydrogen stream to flow from a buffer tank to a reformate conduit for a predetermined duration at one or more predetermined time intervals when a fuel processing assembly is in a standby mode.

A control assembly configured to move at least one valve to an open position for a predetermined duration and at predetermined time intervals.

A control assembly configured to move at least one valve to an open position for a predetermined duration and at one or more predetermined time intervals when a fuel processing assembly is in a standby mode.

A control assembly configured to operate a plurality of heaters to maintain a hydrogen-producing region and one or more hydrogen-selective membranes within a predetermined temperature range.

A control assembly configured to operate a plurality of heaters to maintain a hydrogen-producing region and one or more hydrogen-selective membranes within a predetermined temperature range when a fuel processing assembly is in a standby mode.

INDUSTRIAL APPLICABILITY

The present disclosure, including hydrogen generation assemblies, hydrogen purification devices, and components of those assemblies and devices, is applicable to the fuel-processing and other industries in which hydrogen gas is purified, produced, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A hydrogen purification device, comprising:
   first and second end frames including:
   an input port configured to receive a mixed gas stream containing hydrogen gas and other gases;
   an output port configured to receive a permeate stream containing at least one of a greater concentration of hydrogen gas and a lower concentration of the other gases than the mixed gas stream; and
   a byproduct port configured to receive a byproduct stream containing at least a substantial portion of the other gases;
   at least one hydrogen-selective membrane disposed between and secured to the first and second end frames, the at least one hydrogen-selective membrane having a feed side and a permeate side, at least part of the permeate stream being formed from the portion of the mixed gas stream that passes from the feed side to the permeate side, with the remaining portion of the mixed gas stream, which remains on the feed side, forming at least part of the byproduct stream; and
   a plurality of frames disposed between the first and second end frames and the at least one hydrogen-selective membrane and secured to the first and second end frames, the plurality of frames including at least one permeate frame disposed between the at least one hydrogen-selective membrane and the second end frame, the at least one permeate frame including:
a perimeter shell,
an output conduit formed on the perimeter shell and configured to receive the at least part of the permeate stream from the at least one hydrogen-selective membrane,
an open region surrounded by the perimeter shell, and
at least one membrane support structure that spans at least a substantial portion of the open region and that is configured to support the at least one hydrogen-selective membrane, the at least one membrane support structure being free from holes.

2. The device of claim 1, wherein the at least one membrane support structure includes first and second membrane support plates stacked in the at least one membrane support structure, each of the first and second membrane support plates being free from holes.

3. The device of claim 1, further comprising at least one microscreen structure configured to support the at least one hydrogen-selective membrane, wherein the at least one microscreen structure is disposed between the at least one hydrogen-selective membrane and the at least one permeate frame.

4. The device of claim 3, wherein the at least one microscreen structure includes a non-porous metal sheet having a plurality of apertures forming the plurality of fluid passages.

5. The device of claim 4, wherein each of the plurality of apertures is circular.

6. The device of claim 4, wherein the non-porous metal sheet includes stainless steel.

7. The device of claim 6, wherein the non-porous metal sheet includes stainless steel 303 (aluminum modified).

8. The device of claim 6, wherein the stainless steel includes about 0.6 weight % to about 1.5 weight % of aluminum.

9. The device of claim 6, wherein the stainless steel contains an aluminum oxide layer configured to prevent intermetallic diffusion between the stainless steel and the at least one hydrogen-selective membrane.

10. The device of claim 3, wherein the at least one microscreen structure includes generally opposed surfaces configured to provide support to the permeate side, and a plurality of fluid passages extending between the opposed surfaces.

11. The device of claim 2, wherein the first and second membrane support plates include a plurality of micro-grooves configured to provide flow channels for the at least part of the permeate stream.

* * * * *